US012692973B2

(12) United States Patent
Kloepfer et al.

(10) Patent No.: US 12,692,973 B2
(45) Date of Patent: Jul. 28, 2026

(54) HOLDING STAND FOR A SUPPORT

(71) Applicant: BESSEY Tool GmbH & Co. KG, Bietigheim-Bissingen (DE)

(72) Inventors: Gerhard Kloepfer, Pleidelsheim (DE); Thomas Klein, Besigheim (DE); Heiko Belz, Sersheim (DE)

(73) Assignee: BESSEY Tool GmbH & Co. KG, Bietigheim-Bissingen (DE)

( * ) Notice: Subject to any disclaimer, the term of this patent is extended or adjusted under 35 U.S.C. 154(b) by 0 days.

(21) Appl. No.: 18/786,805

(22) Filed: Jul. 29, 2024

(65) Prior Publication Data

US 2025/0020269 A1    Jan. 16, 2025

Related U.S. Application Data

(63) Continuation of application No. PCT/EP2023/051191, filed on Jan. 19, 2023.

(30) Foreign Application Priority Data

Feb. 1, 2022    (DE) ..................... 10 2022 102 365.6

(51) Int. Cl.
    F16M 11/24          (2006.01)
(52) U.S. Cl.
    CPC ....... F16M 11/245 (2013.01); F16M 2200/08 (2013.01)
(58) Field of Classification Search
    CPC ... F16M 11/245; F16M 11/24; F16M 2200/08
    USPC ......................................................... 248/17
    See application file for complete search history.

(56) References Cited

U.S. PATENT DOCUMENTS

| | | | | |
|---|---|---|---|---|
| 624,662 | A | * | 5/1899 | Leedy ..................... G10D 13/28 |
| | | | | 248/185.1 |
| 1,863,442 | A | | 6/1932 | Goodman |
| 2,042,443 | A | * | 5/1936 | Buckstone ............. F16M 11/18 |
| | | | | 248/404 |
| 2,357,165 | A | * | 8/1944 | Brady ..................... F16M 11/16 |
| | | | | 248/188.7 |
| 2,493,978 | A | * | 1/1950 | Kromer ................... B66F 13/00 |
| | | | | 254/DIG. 1 |

(Continued)

FOREIGN PATENT DOCUMENTS

| | | |
|---|---|---|
| DE | 2656872 | 6/1978 |
| EP | 1528311 | 5/2005 |
| WO | 2017121614 | 7/2017 |

*Primary Examiner* — Nkeisha Smith
(74) *Attorney, Agent, or Firm* — Lipsitz & McAllister, LLC

(57)          ABSTRACT

A holding stand for a support is provided, comprising a put up-receiving device for the support which has a support put up face, and at least three stand legs. Each of the stand legs has a first arm and a second arm which are connected to one another. The second arm is oriented at an acute angle to the first arm. The put up-receiving device is arranged on the first arms of the stand legs. In a holding state of the holding stand, the stand legs define a stand leg put up plane for the holding stand. A floor side of the put up-receiving device facing away from the support put up face lies in the put up plane, at least when a force loading of the put up-receiving device exceeds a specific threshold value or threshold value range in the direction of the put up plane.

38 Claims, 12 Drawing Sheets

(56)                    References Cited

U.S. PATENT DOCUMENTS

| | | | | |
|---|---|---|---|---|
| 2,750,141 | A  * | 6/1956 | Tobias ................. | F16M 11/245 |
| | | | | 248/414 |
| 4,032,098 | A  * | 6/1977 | Marschak .............. | F16M 11/22 |
| | | | | 248/188.7 |
| 7,281,691 | B2 * | 10/2007 | Adelman ............... | F16M 11/28 |
| | | | | 248/188.7 |
| 7,984,884 | B1 * | 7/2011 | Iliev ....................... | A47G 33/12 |
| | | | | 248/527 |
| 11,525,542 | B2 * | 12/2022 | Liao ....................... | F16M 11/10 |
| 2005/0121569 | A1 * | 6/2005 | Willey ................... | F16M 11/38 |
| | | | | 248/168 |
| 2005/0194503 | A1 | 9/2005 | Lee et al. | |
| 2005/0269464 | A1 * | 12/2005 | Adelman ............ | A61M 5/1414 |
| | | | | 248/170 |
| 2015/0159337 | A1 * | 6/2015 | Kellner .................... | E02D 5/80 |
| | | | | 248/156 |
| 2018/0371773 | A1 | 12/2018 | Klein et al. | |
| 2019/0338549 | A1 * | 11/2019 | McDermott ............ | E02D 5/801 |
| 2021/0247021 | A1 * | 8/2021 | Murrow .............. | F16M 11/247 |
| 2023/0147593 | A1 * | 5/2023 | Sato ..................... | F16M 11/247 |
| | | | | 248/170 |

* cited by examiner

HOLDING STAND FOR A SUPPORT

This application is a continuation of international application number PCT/EP2023/051191 filed on 19 Jan. 2023 and claims the benefit of German application number 10 2022 102 365.6 filed on 1 Feb. 2022, which are incorporated herein by reference in their entirety and for all purposes.

BACKGROUND OF THE INVENTION

The invention relates to a holding stand for a support.

The invention also relates to a combination of a holding stand and a support.

EP 1 528 311 A2 relates to a support assembly comprising a base, a head mounted to said base, and a plurality of legs coupled to said base and movable between an open position and a closed position. The legs form a support for the head in an upright position when they are in the open position, and the legs at least partially enclose the base when they are in the closed position.

DE 26 56 872 A1 discloses a stand comprising an inclined arm for holding objects.

US 2005/0194503 A1 discloses a support stand for a worklight.

U.S. Pat. No. 1,863,442 discloses a stand comprising pivotally connected links and legs and telescopic sections.

In accordance with an embodiment of the invention, a holding stand for a support is provided, which enables simple use of a support.

SUMMARY OF THE INVENTION

In accordance with an embodiment of the invention, in the aforementioned holding stand there is provided a put up-receiving device for the support, wherein the put up-receiving device has a support put up face, and at least three stand legs, wherein each of the stand legs has a first arm and a second arm which are connected to one another, wherein the second arm is oriented at an acute angle to the first arm and wherein the put up-receiving device is arranged on the first arms of the stand legs, wherein in a holding state of the holding stand, the stand legs define a stand leg put up plane for the holding stand and a floor side of the put up-receiving device facing away from the support put up face lies in the stand leg put up plane, at least when a force loading of the put up-receiving device exceeds a specific threshold value or threshold value range in the direction of the stand leg put up plane.

A support is, for example, a ceiling support. This support is pre-positionable by means of the holding stand. An operator then has, for example, his hands free for other operations.

In the solution according to the invention, at least given sufficient force loading, a floor side of the put up-receiving device lies in a stand leg put up plane. By this means, due to an impaction, forces acting on the support during a deployment can be conducted away via a support floor. By this means, the force loading on the holding stand can itself be kept small.

This enables, inter alia, the holding stand to be constructed structurally simple. It is also able to be constructed with a smaller mass. Thereby also, the use of the holding stand can be simplified for an operator.

It is herein possible, in principle, that the floor side of the put up-receiving device constantly lies in the stand leg put up plane or only lies in the stand leg put up plane if a specific threshold value or threshold value range of the force loading of the put up-receiving device in the direction of the stand leg put up plane (toward a floor on which the holding stand is placed) is exceeded.

In particular when the holding stand is placed on a floor by means of the stand leg put up plane, in the holding state of the holding stand, the floor side of the put up-receiving device contacts the floor at least when a force loading of the put up-receiving device exceeds a specific threshold value or threshold value range in the direction of the stand leg put up plane. Then, by clamping of the support during a deployment, introduced forces are conducted away via the floor on which the holding stand is placed. By this means, the corresponding mechanical loading of the holding stand is reduced.

In an exemplary embodiment, if there is no force loading of the put up-receiving device in the direction of the stand leg put up plane or if the force loading lies below the specific threshold value or threshold value range, the floor side of the put up-receiving device is spaced from the support plane. This results in a simple positioning capability of the holding stand. There results an unambiguous stand leg put up plane which is defined by the stand legs. If, for example, exactly three stand legs are provided, the stand leg put up plane is unambiguously defined. By means of this spacing from the stand leg put up plane without force loading and/or beneath the specific threshold value or threshold value range, this stand leg put up plane remains unambiguously defined until the threshold value or threshold value range is reached. Thereby again, the holding stand is positionable by simple means without being placed "unsteadily" on a floor. This, in turn, enables easy positioning by an operator.

In particular, at least one of the following is provided:

the specific threshold value or a lower limit of the threshold value range is greater than the weight force of a held support;

the specific threshold value or an upper limit of the threshold value range is less than or equal to 100 N and, in particular, less than or equal to 90 N and, in particular, less than or equal to 80 N and in particular less than or equal to 70 N;

the specific threshold value or a lower limit of the threshold value range is greater than or equal to 30 N and, in particular, greater than or equal to 40 N and, in particular, greater than or equal to 50 N and, in particular, greater than or equal to 60 N.

If the specific threshold value or a lower limit of the threshold value range is greater than the weight force of a held support, then an unambiguous stand leg put up plane results, even if a support is held by the holding stand (but is not yet clamped during a deployment). In particular, the intrinsic weight of the support is not sufficient to bring the floor side of the put up-receiving device onto the stand leg put up plane.

Typically, supports which are usable with the holding stand have a mass of between 3 and 6 kg. Accordingly, the weight force due to the intrinsic weight of such a support lies approximately in the range of between 30 N and 60 N.

The specific threshold value or an upper limit of the threshold value range should not be too large, precisely in order to ensure for typical uses that the floor side reaches the stand leg put up plane. It is then favourable if the specific threshold value or an upper limit of the threshold value range is less than or equal to the aforementioned limits.

Furthermore, it is favourable for the user, as described above, if without a held support or with only the force effect due to the intrinsic weight of a held support, the floor side of the put up-receiving device still does not reach the stand leg put up plane. For this reason, the aforementioned lower limits are useful.

In an exemplary embodiment, it is provided that the specific threshold value is approximately 70 N. This is not achieved by means of the intrinsic weight of a support with a mass of 6 kg. Then, with an additional force effect of 10 N on clamping during a deployment, the stand leg put up plane is reached by the floor side of the put up-receiving device.

The setting of the specific threshold value or the threshold value range is carried out by means of a corresponding construction of the stand legs.

In particular, it is advantageous if at least one of the following is provided:
  the support put up face and the stand leg put up plane are at least approximately parallel to one another;
  the first arms of the stand legs are oriented at least approximately parallel to the support plane;
  when holding a support, the first arms of the stand legs are oriented, starting from a central region in which the support put up face lies, outwardly and, in particular, in a radial direction;
  the acute angle of the orientation of the second arm to the first arm of the respective stand leg lies in the range between 30° and 60°.

By this means, a support is configured to be held securely on the holding stand and to be easily mounted on and/or removed from the holding stand.

In an exemplary embodiment, the stand legs are connected to one another by means of a connecting device on the second arm. By this means, the holding stand is able to be realized in a simple construction and with low mass. A support is able to be held on the holding stand in a secure manner.

It is favourable if adjacent stand legs are directly connected to one another by means of respective second arms and, in particular, articulated on one another. Thereby, a simple construction results.

In particular, a pass-through receiving device for the support is arranged or formed on the connecting device. The support is thus able to be held in a simple manner and then also to be pre-positioned during a deployment. By means of the put up-receiving device with the support put up face, a downward support is achievable. By means of the pass-through receiving device, a lateral support is achievable. By means of the arrangement or formation of the connecting device on the pass-through receiving device, the number of components can be kept low. The holding stand can be constructed with a relatively low mass.

It is very particularly advantageous if a pass-through receiving device is provided for the support, wherein the pass-through receiving device has an aperture for the passing-through of the support. The support is positionable in the aperture with a support strut. The pass-through receiving device provides for a lateral support of the corresponding support strut. A support is then achieved downwardly and by means of the put up-receiving device and a lateral support is achieved by means of the pass-through receiving device. By means of the holding stand, the support is thus configured to be automatically held upright. The support is then pre-positionable during a deployment by displacing the holding stand on a substrate (a floor).

It is favourable in terms of construction if the pass-through receiving device is arranged on the second arm of the stand legs. This results in a favourable configuration of the holding stand in terms of construction and production technology.

In particular, at least one of the following is provided:
  the aperture has a middle axis which meets the support put up face of the put up-receiving device;
  the aperture has a middle axis which is oriented transversely and, in particular, perpendicularly to the stand leg put up plane and/or the support put up face;
  the pass-through receiving device is spaced in a height axis from the support put up face of the put up-receiving device, wherein with a holding stand placed on the floor, in the holding state of the holding stand, the pass-through receiving device lies, relative to the direction of gravity, above the support put up face;
  the aperture has an substantially hollow cylindrical shape;
  the aperture is closed in a peripheral direction to hold the support or, when holding the support at the aperture, the pass-through receiving device has not more than one lateral slit through which the held support is not able to be passed out.

By means of the orientation of the aperture with a middle axis which meets the support put up face, a support is able to be held substantially perpendicularly to the support put up face on the holding stand. By means of a spacing of the pass-through receiving device in a height axis from the support put up face, a secure hold of the support on the holding stand is achieved.

If the aperture for holding the support in a peripheral direction is closed or has not more than one lateral slit which, in a closed state, does not permit a passing-through of the support, the support is able to be held securely on the holding stand.

It is very particularly advantageous if the pass-through receiving device has a connecting device or is arranged on a connecting device, wherein the connecting device has a closed state and an open state and, in the closed state of the connecting device, provision is made for a holding of the support on the pass-through receiving device and, in the open state, the support is bringable in a direction parallel to the support put up face into the aperture and/or the support is removable in a direction parallel to the support put up face out of the aperture. In the closed state, the holding state of the holding stand is achieved and the pass-through receiving device secures the support against falling out laterally. By means of the open state, the support is easily insertable into the aperture of the pass-through receiving device and/or removable therefrom. It is then possible, for example, to insert the support in the direction parallel to the support put up face (in a direction perpendicularly to a height axis of the holding stand), even if, for example, it has locating elements which have larger dimensions than the aperture of the pass-through receiving device. This results in an easy operability.

It is then, in particular, favourable in terms of construction if at least one stand leg is rotatably articulated on an adjacent stand leg in the region of the aperture. Thereby, a pass-through receiving device, which is openable and/or closable to insert a support, can easily be realised. Furthermore, a storage state for space-saving storage of the holding stand can easily be achieved.

In an exemplary embodiment, a locking device is provided, by means of which a second stand leg which is articulated on a first adjacent stand leg is lockable to a further third adjacent stand leg, wherein on a locking of the second stand leg to the third stand leg, a rotatability of the second stand leg on the first stand leg is blocked and the aperture is configured for holding a support. In this way, in a simple manner, a pass-through receiving device can be realised which is openable to a certain extent to insert and/or remove the support, and wherein, starting from this opened state, by means of the locking device, a closed state is then fixable with a holding function for the support.

In an exemplary embodiment with a favourable construction, the locking device comprises a pin and receptacles for the pin on the second stand leg and the third stand leg, wherein a locking is created with the pin extended into the receptacles, and wherein with the pin removed, the second stand leg is rotatable on the first stand leg. Thereby, in a simple manner, an aperture closed for a holding of the support can easily be achieved and this aperture itself is itself able to be "spread" by removal of the pin so that the support is accordingly insertable and/or removable. The number of the components for the holding stand can be kept small.

In an exemplary embodiment, a first stand leg is provided, to which a second stand leg is rotatably articulated by means of a first rotary joint and a third stand leg is provided which is rotatably articulated on the first stand leg by means of a second rotary joint, and a locking device is provided which is arranged on the second stand leg and the third stand leg. A holding stand of simple construction with a stable holding function for a support is thus provided. Large force loadings can be conducted into a floor on which the holding stand is placed.

In particular, a storage state of the holding stand is provided with at least one of the following:

the first rotary joint, the second rotary joint and the locking device lie in one line in the storage state;

the first arm of the first stand leg, the first arm of the second stand leg and the first arm of the third stand leg lie parallel to one another in the storage state;

adjacent connecting bodies of the stand legs abut one another in the storage state, wherein a connecting body of a stand leg provides for a connection of the respective first arm and second arm.

In the storage state, relatively compact dimensions can then be achieved for space-saving storage of the holding stand.

It is also advantageous if at least one of the following is provided:

a rotation axis of the rotatable articulation of a stand leg on an adjacent stand leg lies transversely and, in particular, perpendicularly to the support put up face and/or the stand leg put up plane;

a rotation axis of the rotatable articulation lies at least approximately parallel to a height axis of the holding stand in the holding state of the holding stand;

a removing/inserting direction of a pin of a locking device for locking adjacent stand legs to one another lies transversely and, in particular, perpendicularly to the support put up face and/or the stand leg put up plane;

adjacent stand legs are directly connected to one another by means of their respective second arms by means of the rotatable articulation or a locking device.

This results in a constructionally simple configuration. A support is easily introducible into, and removable again from, the aperture in the pass-through receiving device. The support is able to be held on the holding stand in a stable manner.

The relevant holding stand is producible in a simple and economic manner.

The holding stand is operable by a user in a simple manner.

It is favourable if, in the open state of the locking device, the holding stand is in a storage state or is bringable into the storage state, wherein in a storage state, the stand legs are oriented at least approximately parallel to one another and, in particular, are positioned packed over one another. Thereby, compact dimensions and a small space requirement for the holding stand in the storage state are achieved.

A configuration of simple construction results if the respective second arms have a first end region on which the pass-through receiving device for the support is arranged and a second end region which is opposite to the first end region and at which they are connected to the respective associated first arm. The mass of the holding stand can thereby be kept small.

It is favourable if on the first end region of the respective second arms a holding body is situated, in particular with at least one of the following:

the holding body is made of a plastics material;

the holding body has a limiting wall for the opening which has, in particular, an extent parallel to a middle axis of the aperture;

the holding body has a transverse strut device between a strut of the second arm and the limiting wall;

the holding body is placed onto a strut of the second arm;

the holding body has the form of a triangular prism;

at least partially arranged or formed on the holding body is at least one rotary joint for articulating an adjacent second arm and/or a locking device for locking to an adjacent second arm.

The holding stand can therefore be produced and configured in a simple manner. By means of the holding body, the pass-through receiving device can be realised in a simple manner. A stable construction results.

It is further favourable if the respective first arms have a first end region on which the put up-receiving device is arranged and a second end region which is opposite to the first end region and at which the respective first arm is connected to the associated second arm. A stable holding stand can thereby be realised.

It is favourable if a connecting body is situated on the respective second end region, connecting the first arm to the associated second arm, in particular with at least one of the following:

the connecting body is placed onto the first arm and/or the second arm;

the connecting body is made of a plastics material;

the connecting body is constructed in a single piece;

the connecting body has a transverse strut device between a strut of the first arm and a strut of the second arm;

the connecting body is constructed as a triangular prism;

the connecting body forms a stand element for the respective stand leg;

the connecting bodies of the stand legs together form a standing area for the holding stand.

The holding stand can therefore be produced in a simple manner. The first arm and the second arm can each be produced separately in a simple manner. A corresponding connection takes place by means of the connecting body.

It is very particularly advantageous if the connecting body of the stand legs has an underside which lies in the stand leg put up plane, wherein the respective underside is, in particular, spaced from the put up-receiving device. In particular, the undersides of the connecting bodies define the stand leg put up plane. If, for example, there are three stand legs, then the three connecting bodies of the stand legs unambiguously define the stand leg put up plane.

Furthermore, the holding stand according to the invention is configured to be produced in a simple and economical manner if a support body is arranged on the first end region of each first arm, wherein the support bodies on a stand leg together form the put up-receiving device with the support put up face.

It is then advantageous if at least one of the following is provided:

support bodies arranged on different stand legs are mutually separate elements;

a support body is made of a plastics material;

a support body is placed onto a strut of the associated first arm;

a support body is constructed as a single piece;

the support put up face provided on the support bodies is formed ribbed.

In the holding state of the holding stand, the totality of the support body provides the put up-receiving device for the support. The support is configured to be held on the holding stand in a secure manner. Furthermore, the support is configured to be fixed to, and/or removed from, the holding stand in a simple manner. For example, the separation of the support bodies on the different stand legs permits a pivotability of the stand legs relative to one another in a simple manner. By means of this pivotability, the support is configured to be introduced in a simple manner into a pass-through receiving device and/or removed therefrom. A storage state can be achieved in a simple manner.

In an exemplary embodiment, a support body has a base in which a partial region of the support put up face is arranged and, arranged on the base is an overlap element with a wall region, wherein the wall region is spaced in a direction transversely to the support put up face and in this direction lies above the support put up face. Thereby, a type of undercut is formed with a receptacle. A locating element (locating plate) of a support is configured to be introduced into this receptacle and secured against withdrawal upwardly (away from the support put up face) by corresponding locating from below at the respective wall region.

It is then advantageous if at least one of the following is provided:

wall regions of different support bodies are spaced from one another;

a wall region has a smaller longitudinal extent than a partial region of an associated support put up face on the same base;

a wall region is set back with respect to an end side of the base;

a wall region extends toward a centre of the holding stand on the support put up face.

If wall regions of different support bodies are spaced from one another, then an intermediate space is formed, via which the support is configured to be inserted from above, in particular, with a locating element of the support. The smaller longitudinal extent of the wall regions contributes thereto and/or the setting back of the wall regions relative to an end side of the base.

A wall region extends toward a centre of the holding stand on the support put up face, wherein however it is, in particular, spaced (in a radial direction) from this centre.

It is favourable if in the holding state of the holding stand, the support bodies lie on a planar and, in particular, regular p-sided polygon, wherein p is greater than or equal to 3 and in particular a triangle, in particular with one of the following:

a geometrical centre of gravity of the polygon lies on a centre of the support put up face;

the support bodies and/or struts of the first arms are oriented along side bisectors or diagonals of the polygon;

in the holding state of the holding stand, the support bodies and/or struts of the first arms are oriented radially;

partial regions of the support put up faces are arranged spoke-like;

the support bodies of different stand legs are directed toward one another at their end sides and are not connected to one another at the end sides.

A high degree of placement stability is thereby provided for the holding stand in the holding state. A support is able to be securely held. A tilting moment can be minimised.

It is favourable if a free space sector lies in the radial direction between adjacent support bodies. Through this free space sector, in particular, a locating element of a support is configured then to be placed on the support put up face. By means of a rotation of this locating element, it is configured to be brought into a receptacle and is thus also configured to be secured against withdrawal upwardly.

It is very particularly advantageous if a support body is adapted at the end side to an opposingly situated support body, wherein in the holding state of the holding stand, in particular, an end side spacing between opposingly situated support bodies is not more than 5 mm and, in particular, not more than 4 mm and, in particular, not more than 3 mm and, in particular, not more than 2 mm and, in particular, not more than 1 mm. In particular, support bodies can also abut one another at their end side in the holding state. If the spacing is correspondingly small or there is even contact at the end side, optimally, a force is conductable by means of the put up-receiving device into a floor on which the holding stand is placed.

It is favourable if a support body is provided at its end side with at least one inclined face and, in particular, is constructed wedge-shaped. Thereby, the support bodies are configured to adapt optimally to one another at their end side with minimal spacings from one another.

It is favourable if the holding stand has a holding state for holding the support and a storage state for storing the holding stand, in particular with one of the following:

in the holding state, the first arms of the stand legs are oriented, starting from a centre in which the support put up face lies, outwardly and, in particular, radially outwardly;

in the holding state, the stand legs have an identical angular spacing from adjacent stand legs;

in the storage state, the first arms of the stand legs are oriented at least approximately parallel to one another;

in the storage state, the first arms of the stand legs are positioned packed over one another.

Thus, in the holding state, a stable erectability of the holding stand with the support and, in the storage state, compact dimensions can be achieved.

In an exemplary embodiment, the support put up face is constructed in multiple parts with a plurality of partial regions, wherein the partial regions are arranged on the respective first arms. In this means, the holding stand can be realized in a simple construction. In particular, a relative movability of stand legs relative to one another can thereby be achieved. Thereby, for example, a storage state with compact dimensions can be realised. In operation of the holding stand, for example, a support is easily insertable.

According to the invention, a combination of a holding stand according to the invention and a support is provided, wherein in particular the support is removably held by the holding stand. An exemplary embodiment of a corresponding support is described, for example, by WO 2017/121614 A1.

The following description of preferred embodiments, in conjunction with the drawings, serves to explain the invention in greater detail.

DETAILED DESCRIPTION OF THE INVENTION

A holding stand according to the invention serves for holding a support such as, for example, a ceiling support. An exemplary embodiment of a corresponding support is described, for example, in WO 2017/121614 A1.

Figure 6:
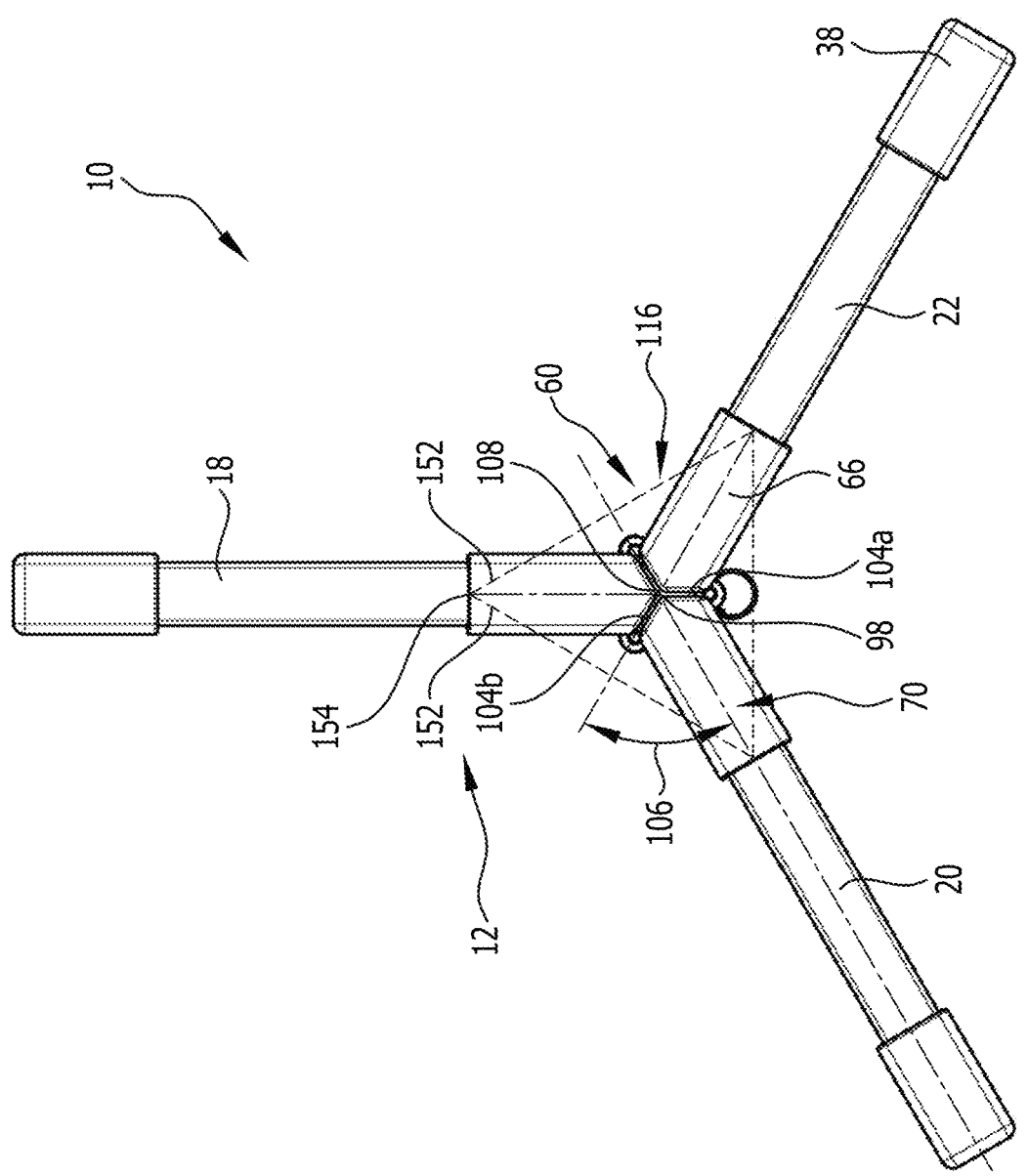
FIG. 6 shows a view from below of the holding stand according to FIG. 1 in the direction D according to FIG. 1.
Figure 7:
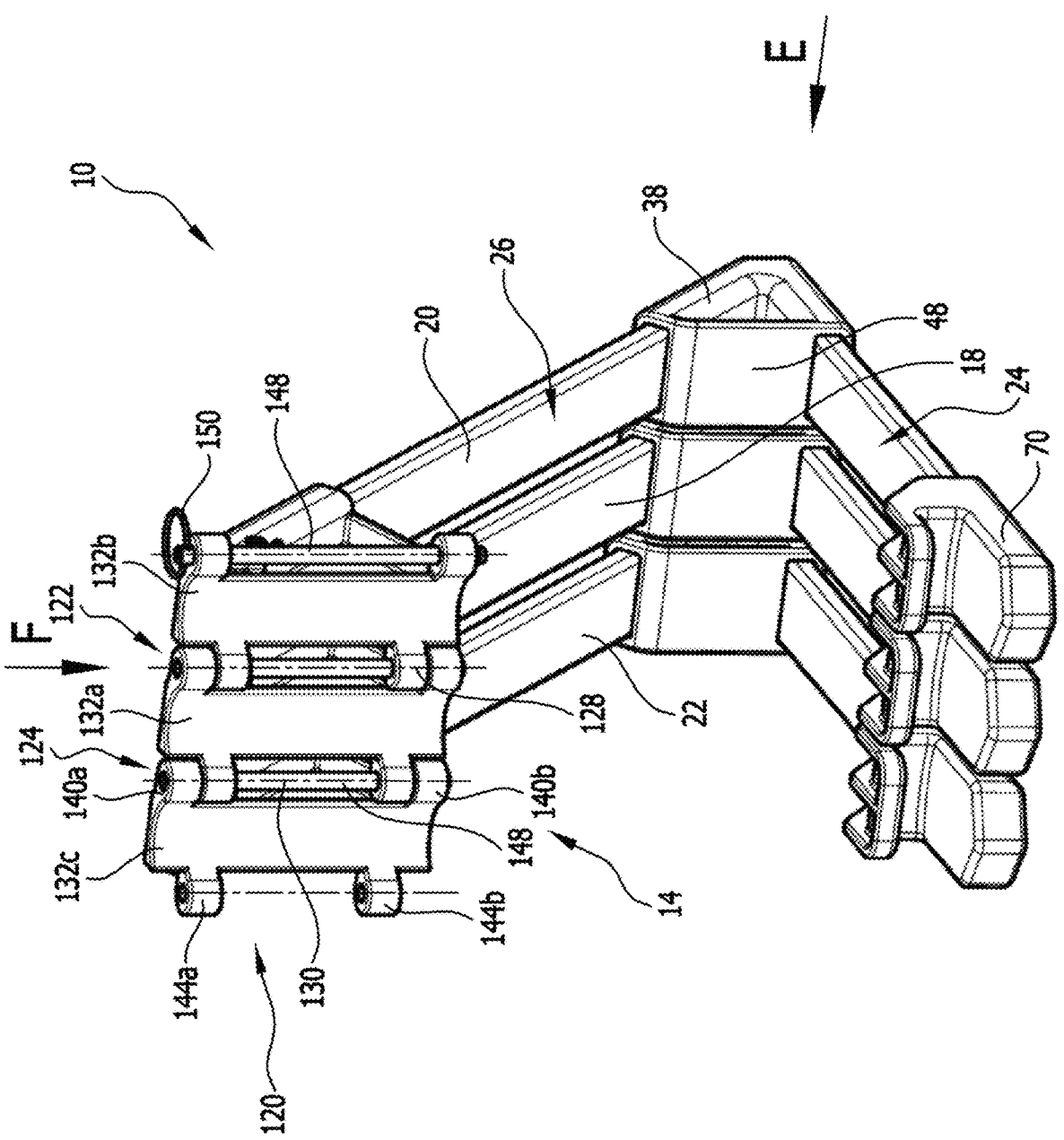
FIG. 7 shows a storage state of the holding stand according to FIG. 1 in a perspective representation.
Figure 8:
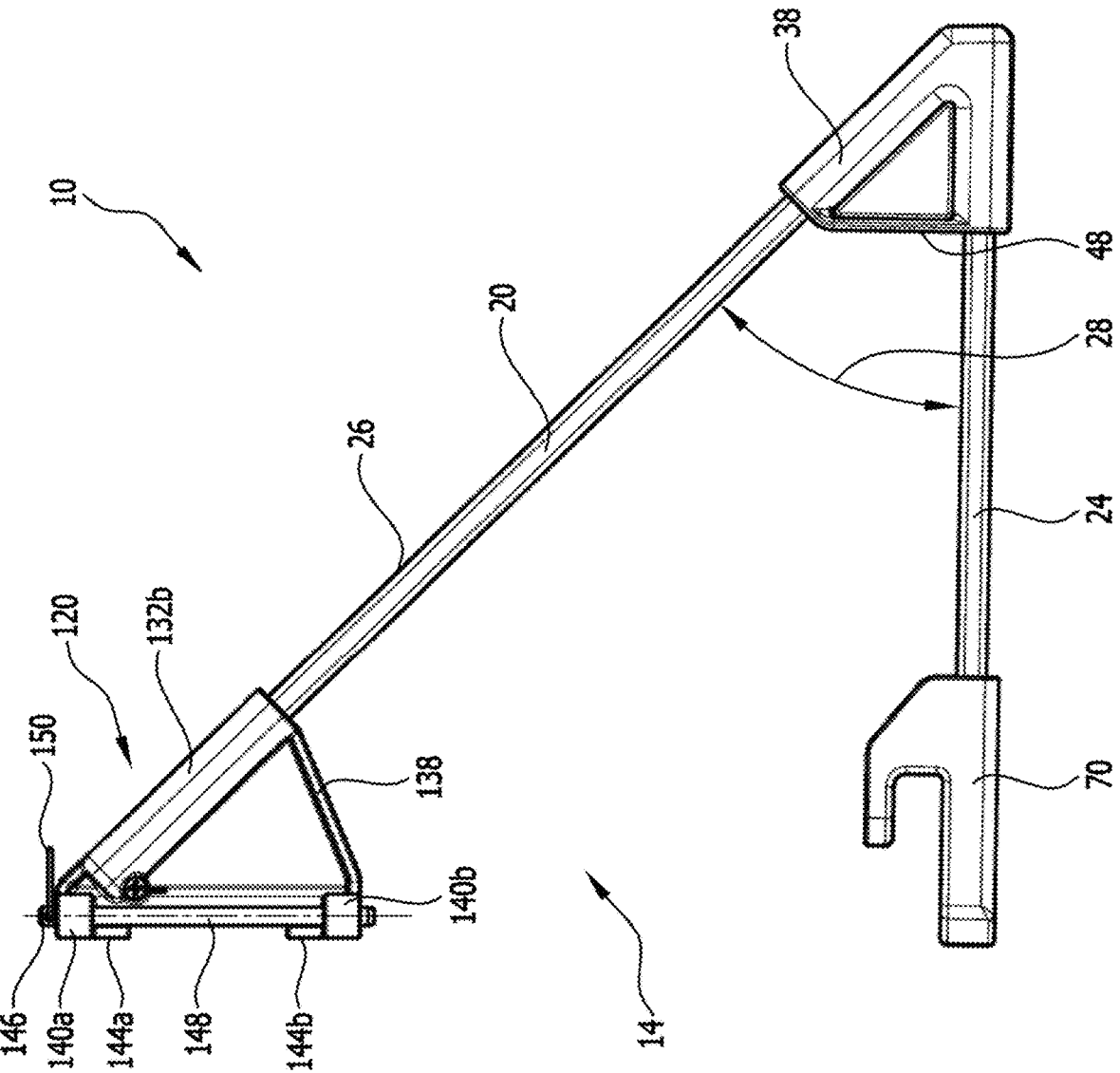
FIG. 8 shows the holding stand according to FIG. 7 in the storage state in a view according to the direction E according to FIG. 7.
Figure 9:
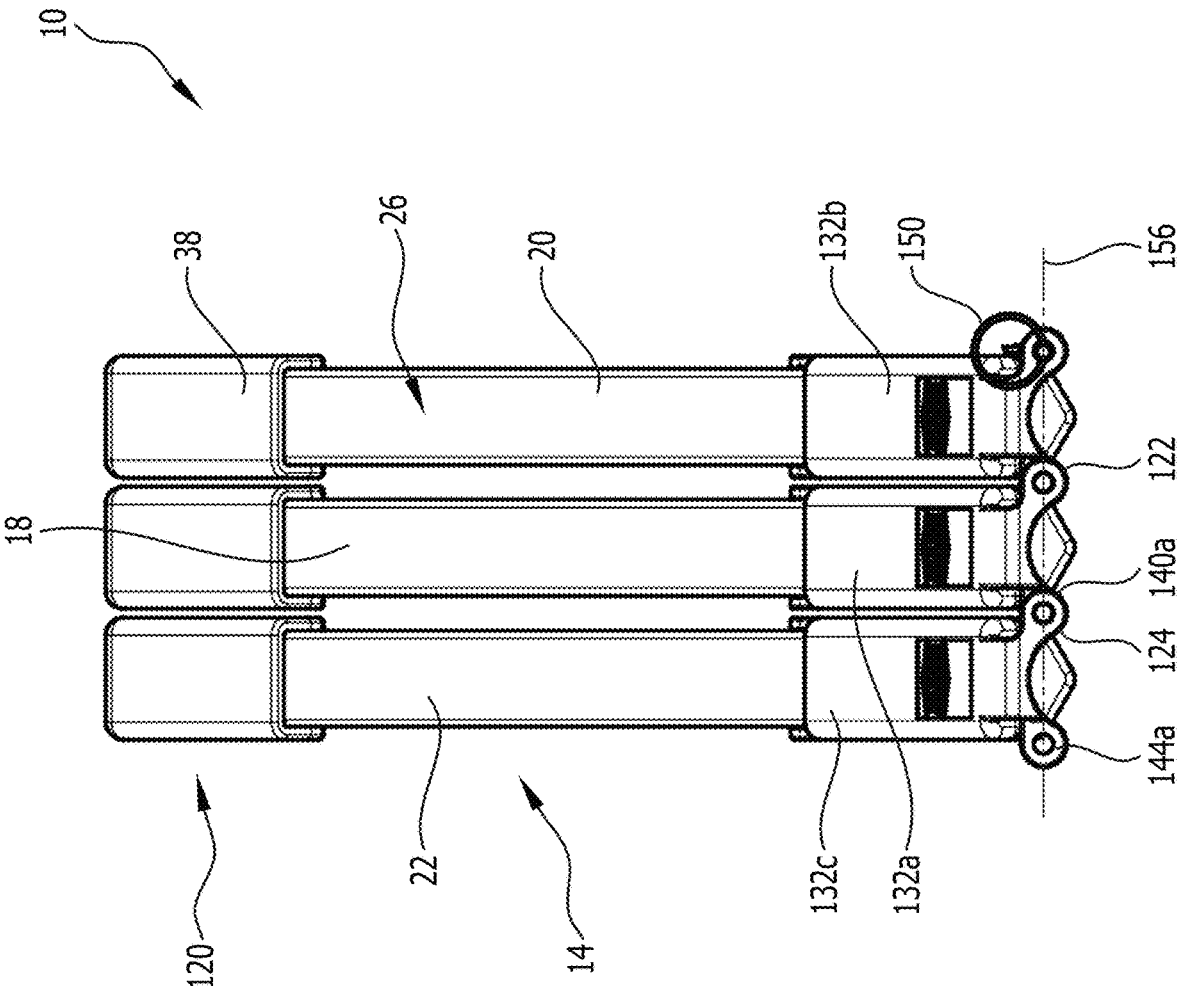
FIG. 9 shows the holding stand in the storage state according to FIG. 7 in a view from above according to the direction F according to FIG. 7.
Figure 10:
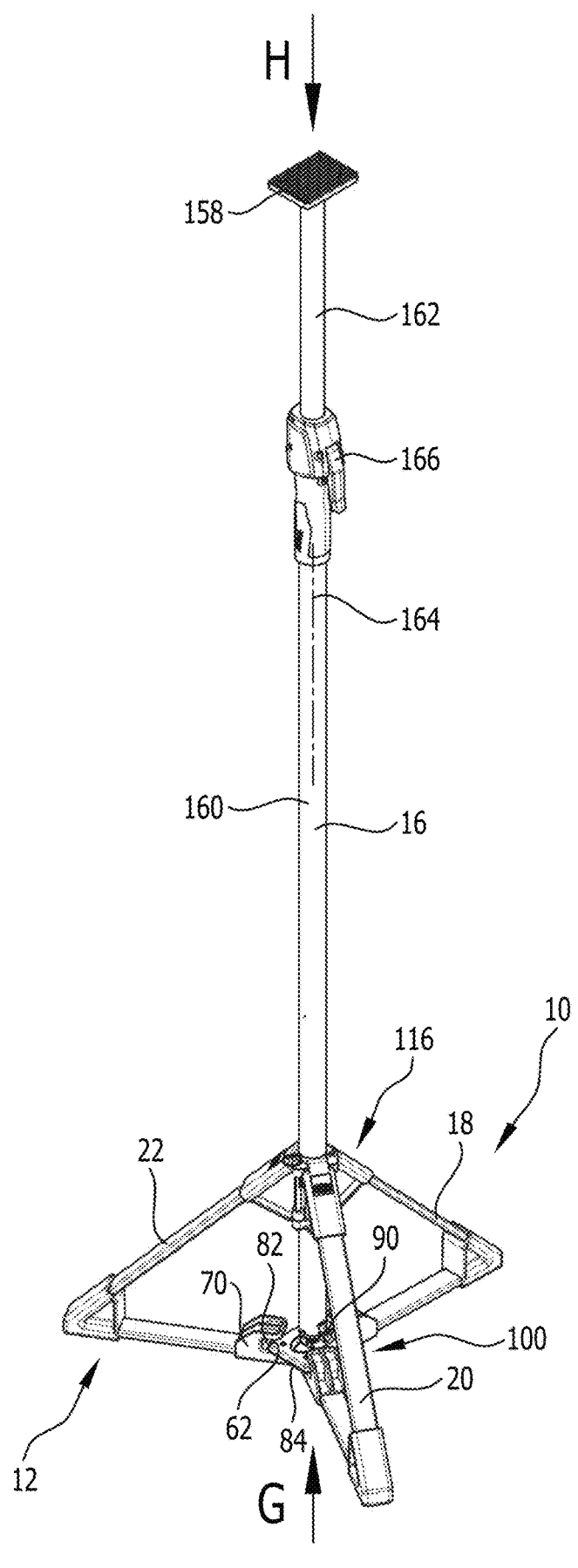
FIG. 10 shows the same view of the holding stand according to FIG. 2 with a held support.
Figure 11:
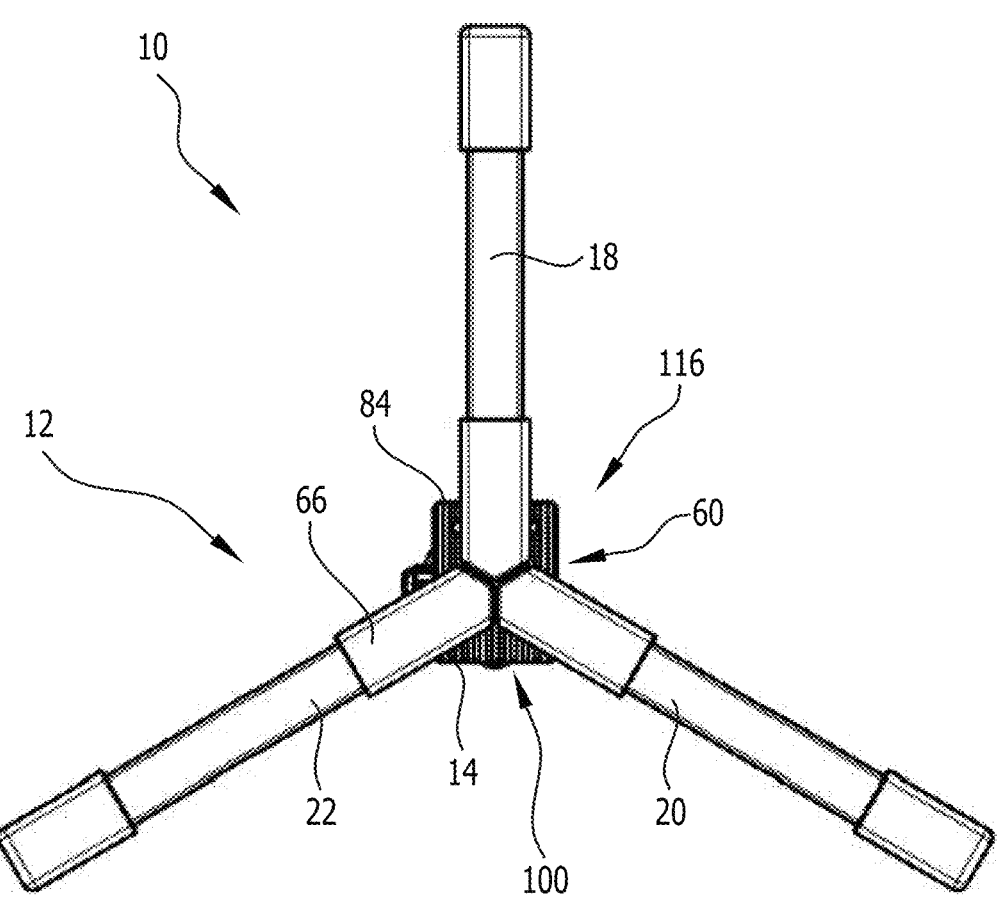
FIG. 11 shows the holding stand with a support according to FIG. 10 in a view from below according to the direction G according to FIG. 10.
Figure 12:
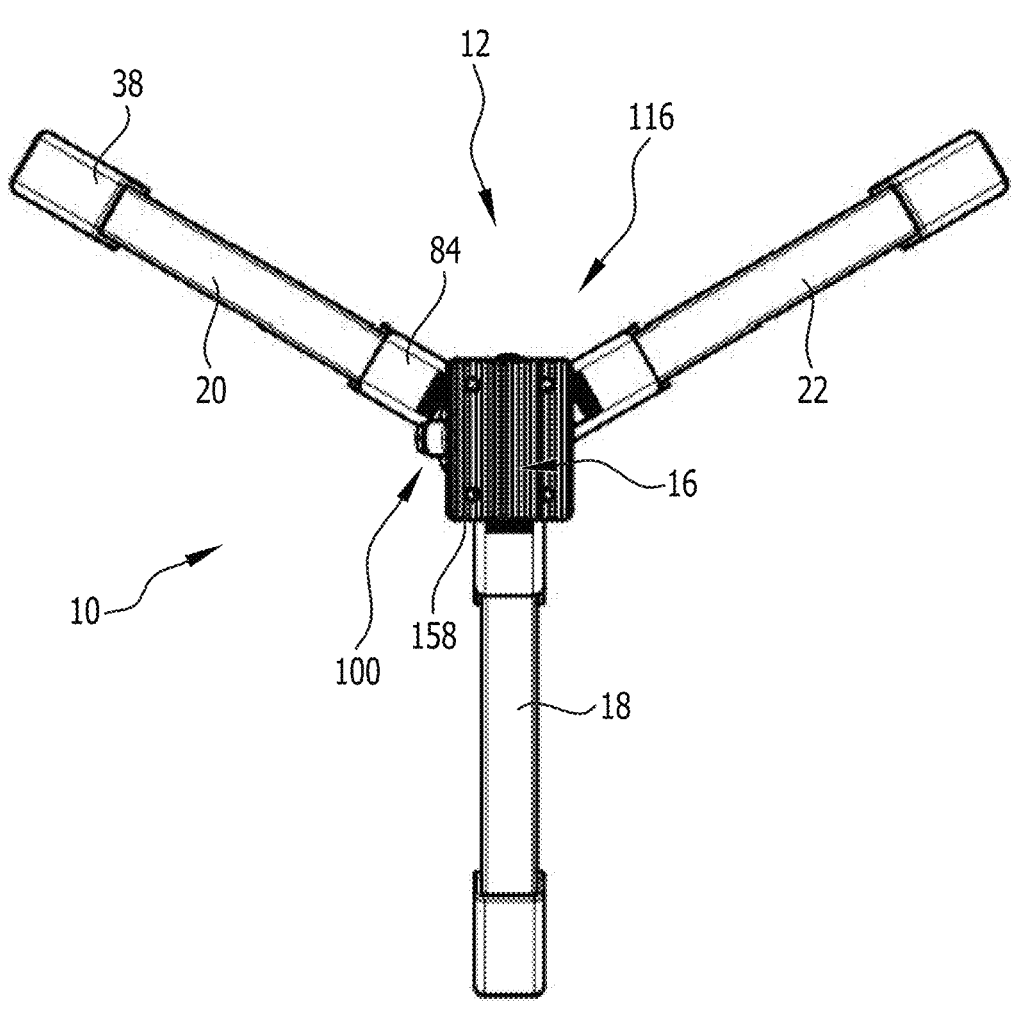
FIG. 12 shows the holding stand with the support according to FIG. 10 in a view in the direction H according to FIG. 10.

One exemplary embodiment of a holding stand 10 according to the invention which is shown in FIGS. 1 to 6 in a holding state 12 and in the FIGS. 7 to 9 in a storage state 14 serves for the upright holding of a support 16 (FIGS. 10 to 12).

The holding stand 10 has at least three stand legs and, in particular, exactly three stand legs.

In the exemplary embodiment shown, the holding stand 10 has a first stand leg 18, a second stand leg 20 and a third stand leg 22.

Each of the stand legs 18, 20, 22 has a first arm 24 and a second arm 26 in each case. The respective first arm 24 and second arm 26 are oriented on the stand leg 18 and/or 20 and/or 22 at an acute angle 28 to one another. This acute angle 28 lies in the range between 30° and 60°. In the exemplary embodiment shown in the drawings, the acute angle 28 is 45°.

The respective first arm 24 has a first end region 30 and an opposingly situated second end region 32.

The respective second arm 26 has a first end region 34 and an opposite second end region 36.

The first arm 24 is connected at its second end region 32 to the second arm 26 at the second end region 36 thereof, forming the acute angle 28.

The first arm 24 and the second arm 26 are connected to one another in an exemplary embodiment at the respective end regions 32, 36 by means of a connecting body 38. The first arm 24 has a first strut 40. The second arm 26 has a second strut 42. The connecting body 38 connects the first strut 40 and the second strut 42.

In an exemplary embodiment, the connecting body 38 is made from a plastics material. It is, in principle, also producible, for example, from a metal material.

It has a first receptacle 44 for the first strut 40. The first receptacle 44 is, in particular, an aperture into which the first strut 40 is inserted and, in particular, pressed in.

The connecting body further has a second receptacle 46 (see, for example, FIG. 2) into which the second strut 42 of the second arm 26 is inserted and, in particular, pressed in. The first receptacle 44 and the second receptacle 46 are formed relative to one another on the connecting body 38 so that the first strut 40 and the second strut 42 and therefore the first arm 24 and the second arm 26 lie at an acute angle 28 to one another.

The connecting body 38 is constructed, in particular, in one piece.

The connecting body 38 has a transverse strut device 48 which is formed, in particular, by a wall of the connecting body 38 and by means of which the second strut 42 is supported on the first strut 40, in particular in a direction parallel to a height axis 50 of the holding stand 10 (in the holding state 12). The transverse strut device 48 is therein arranged spaced from an intersection line of the first strut 40 with the second strut 42.

In an exemplary embodiment, the connecting body 38 is constructed block-like and has the shape of a triangular prism. In particular, the transverse strut device 48 is constructed as a continuous block wall between the receptacles 44, 46.

It is also possible that the connecting body 38 between the transverse strut device 48, the first receptacle 44 and the second receptacle 46 has a continuous aperture with an aperture axis transversely to the height axis 50.

The connecting bodies 38 of the stand legs 18, 20, 22 are, in principle, constructed identically.

The connecting body 38 forms a stand element 52 (a stand foot) of the respective stand leg 18, 20, 22.

A stand leg put up plane 54 (FIG. 3) is associated with the holding stand 10 in the holding state 12. An underside 56 of the connecting body 38 of the stand legs 18, 20, 22 defines this stand leg put up plane 54.

If the holding stand 10 is placed with the stand legs 18, 20, 22 on a floor and, in particular, a planar floor 58, then the stand leg put up plane 54 coincides geometrically with a planar upper side of this floor 58.

The height axis 50 lies perpendicularly to the stand leg put up plane 54.

The holding stand 10 has a put up-receiving device 60 for the support 16. The put up-receiving device 60 serves for supporting the support 16 downwardly in the direction of the height axis 50 toward the stand leg put up plane 54.

The put up-receiving device 60 has a support put up face 62 for contacting the support 16 and support downwardly.

The put up-receiving device 60 is arranged and/or formed together on the first arms 24 of the stand legs 18, 20, 22.

The holding stand 10 further has a pass-through receiving device 64. This is spaced in the height axis 50 from the put up-receiving device 60 and is arranged relative to the height axis 50, when the holding stand 10 stands on the floor 58, and relative to the direction of gravity, above the put up-receiving device 60.

The pass-through receiving device 64 embraces a held support 16 and provides a positive locking in transverse directions relative to the height axis 50. It provides for a positive locking in radial directions (and, in particular, in all radial directions) to the height axis 50 and embraces a held support 16 in the peripheral direction.

The pass-through receiving device 64 is arranged on the first end regions 34 of the second arms 26 of the stand legs 18, 20, 22.

The put up-receiving device 60 has a floor side 66 which faces away from the pass-through receiving device 64 and also faces away from the support put up face 62 of the put up-receiving device 60. The floor side 66 faces toward the stand leg put up plane 54.

It is provided that the floor side 66 lies in the stand leg put up plane 54, at least when a force loading of the put up-receiving device 60 in the direction of the stand leg put up plane 54 (in FIG. 3, this force loading is indicated by the reference sign 68) exceeds a specific threshold value or threshold value range. This is described in greater detail below. The force can then be conducted by means of the put up-receiving device 60 into the floor 58 on which the holding stand 10 is placed. By this means, the force loading on the holding stand 10 can itself be optimised and/or kept small.

In principle, the put up-receiving device 60 can be constructed in one piece. In the exemplary embodiment shown, in which the holding stand 10 has the storage state 14, the put up-receiving device 60 is constructed in multiple parts and comprises support bodies 70, wherein a support body 70 is arranged on each stand leg 18, 20, 22 on the respective first end region 30.

In an exemplary embodiment, the respective support bodies 70 are made of a plastics material and are constructed, in particular, in one piece. However, they can, for example, also be made of a metal material.

The respective support body 70 has a receptacle 72 into which the respective first strut 40 of the corresponding first arms 24 is positioned. In particular, a support body 70 is placed with its receptacle 72 onto the first strut 40 of the respective first arm 24 and then this first strut 40 is preferably pressed in.

A support body 70 has a base 74 on which a partial region 76 of the support put up face 62 is formed. The partial regions 76 on all the support bodies 70 then form the whole support put up face 62 in the holding state 12 of the holding stand 10.

Arranged on the base 74, in particular connected integrally with the base 74, is an overlap element 78. This overlap element 78 (see e.g. FIG. 3) comprises a wall region 80 which is spaced in a direction transversely from the support put up face 62 (transversely to the partial region 76) and, in particular, spaced in the height axis 50 from the support put up face 62 (i.e. spaced from the partial region 76). Relative to the height axis 50, the wall region 80 is arranged above the partial region 76 of the support put up face 62 on the respective support body 70.

By means of the wall region 80 of the overlap element 78, an undercut is formed on the respective support body 70. Formed between the wall region 80 and the partial region 60 of the support put up face 62 of a support body 70 is a receptacle 82 for a locating element 84 which is, in particular, a locating plate of the support 16 (see, for example, FIG. 10). If the corresponding locating element 84 is positioned in this receptacle 82, then by means of the wall region 80, a removal upwardly in the height axis 50 is blocked.

Figure 1:
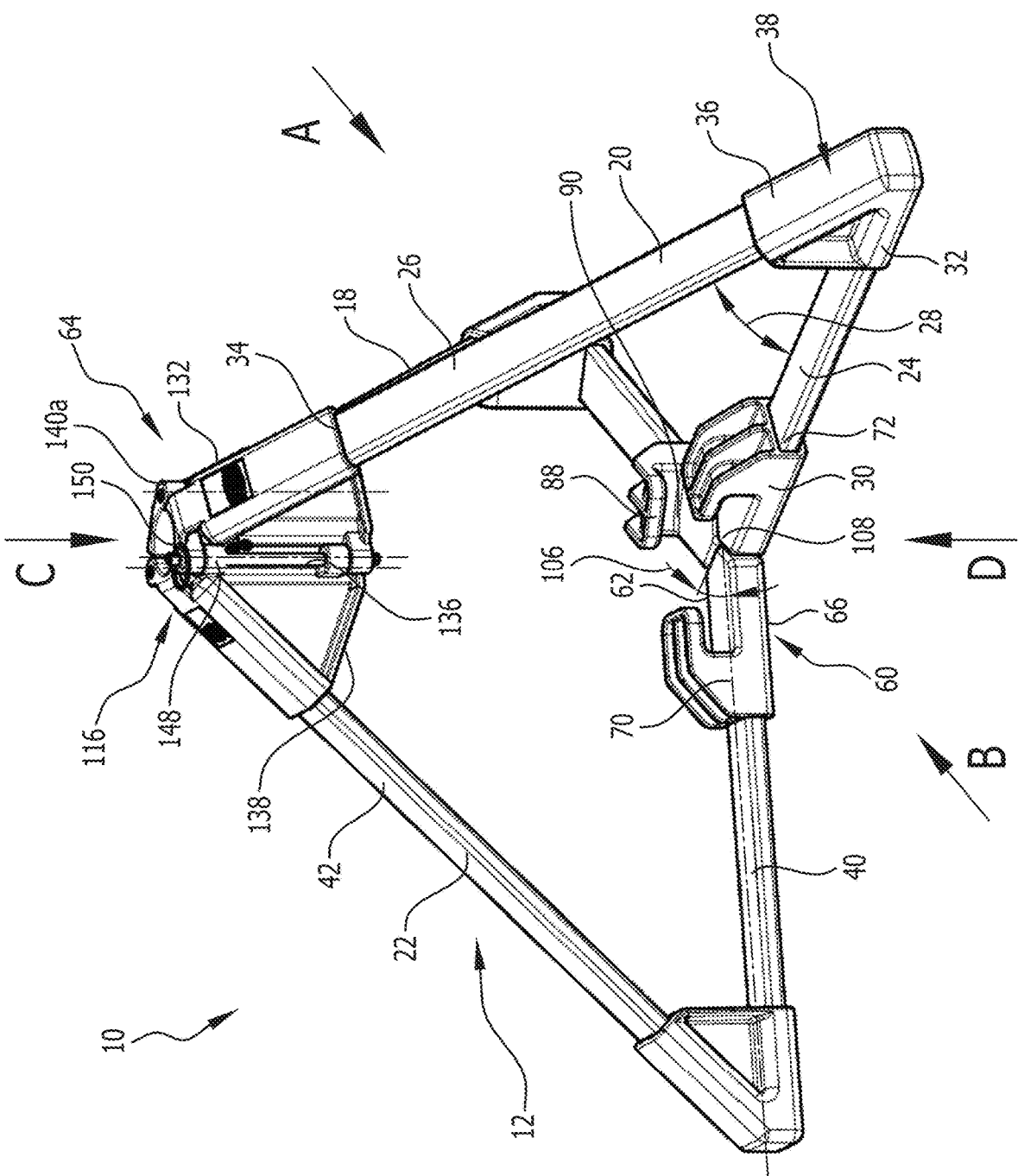
FIG. 1 shows an exemplary embodiment of a holding stand according to the invention in a holding state (without a held support) in a perspective representation.
Figure 2:
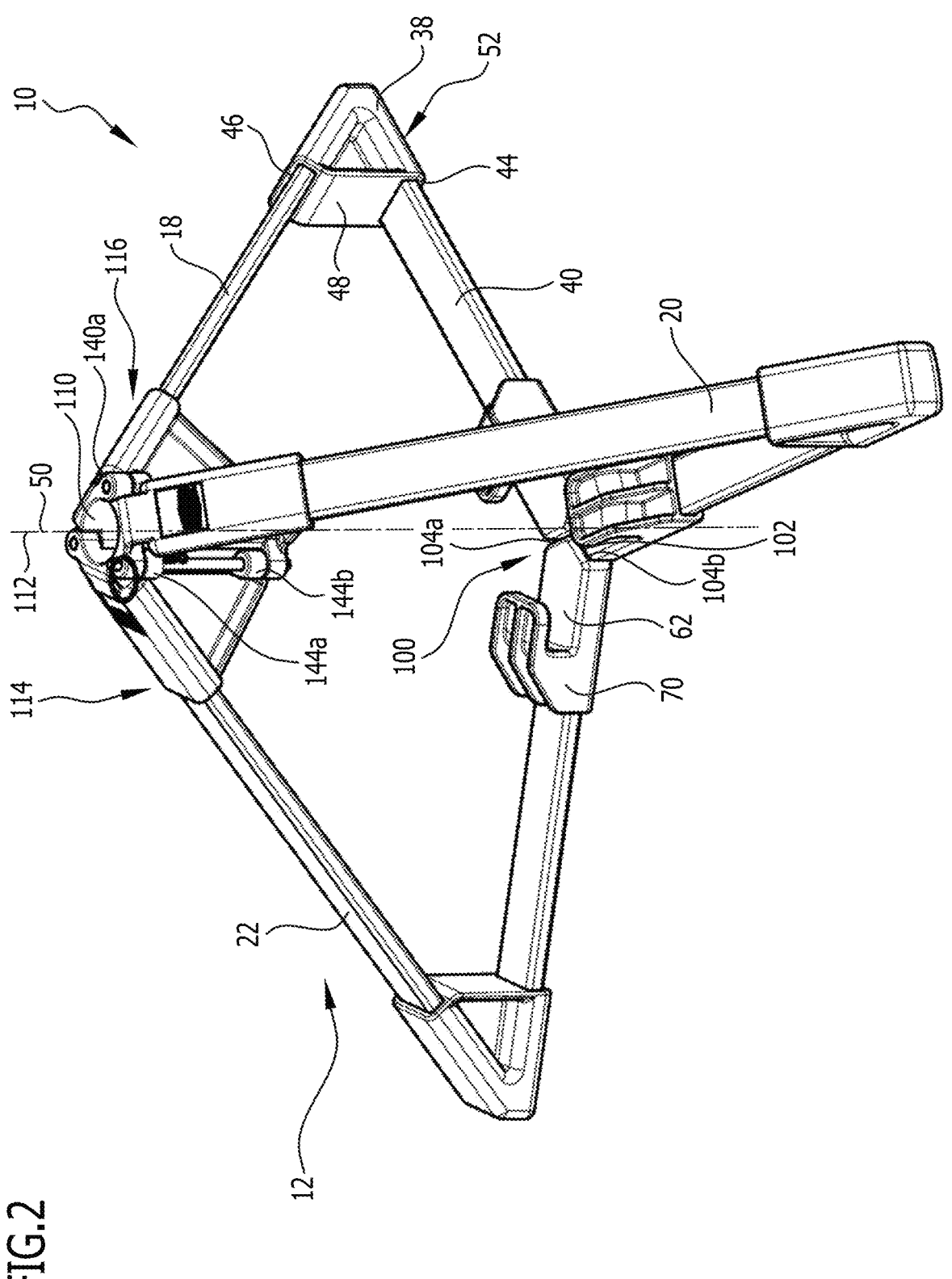
FIG. 2 shows a further perspective representation of the holding stand according to FIG. 1.
Figure 3:
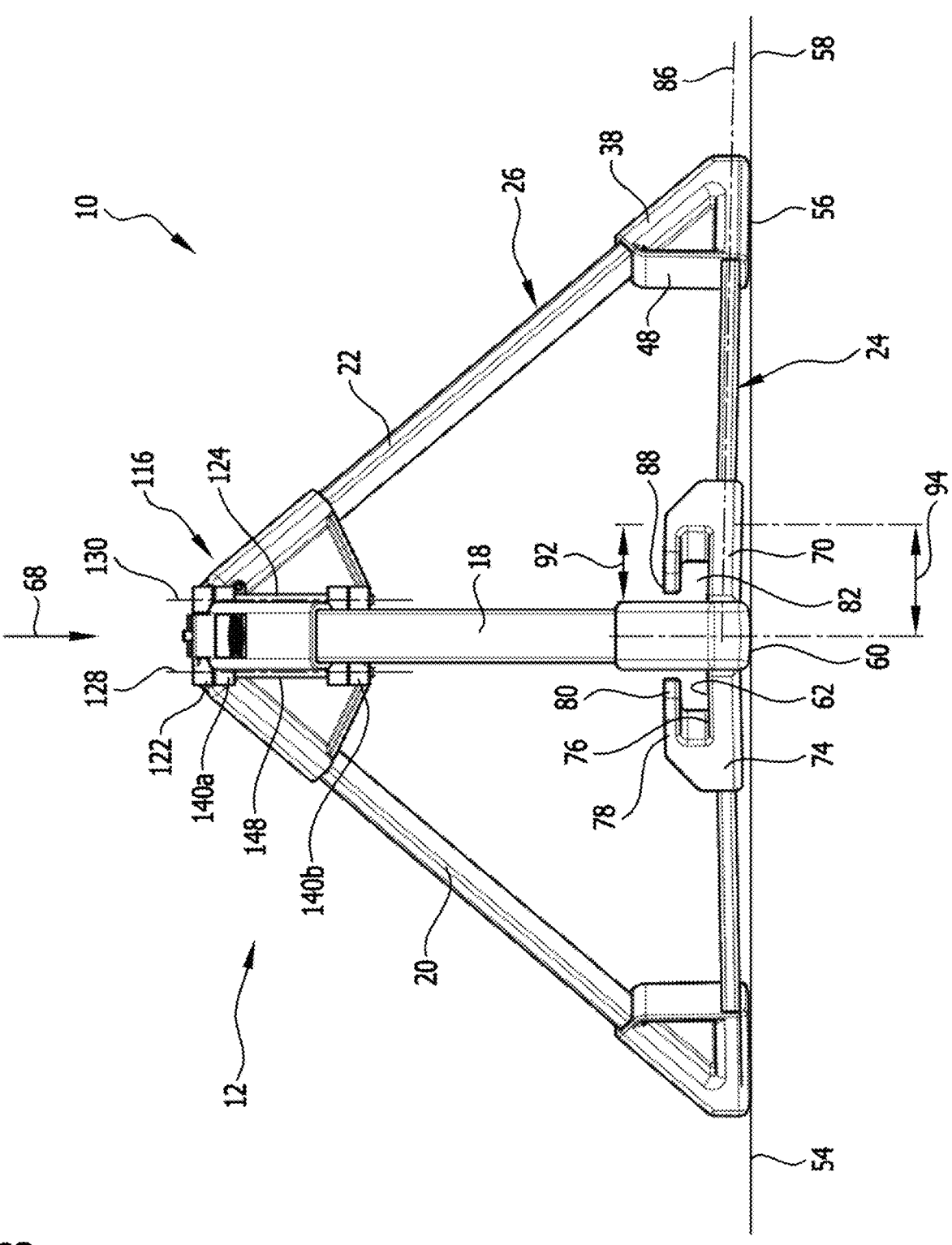
FIG. 3 shows a plan view of the holding stand according to FIG. 1 in the direction A according to FIG. 1.
Figure 4:
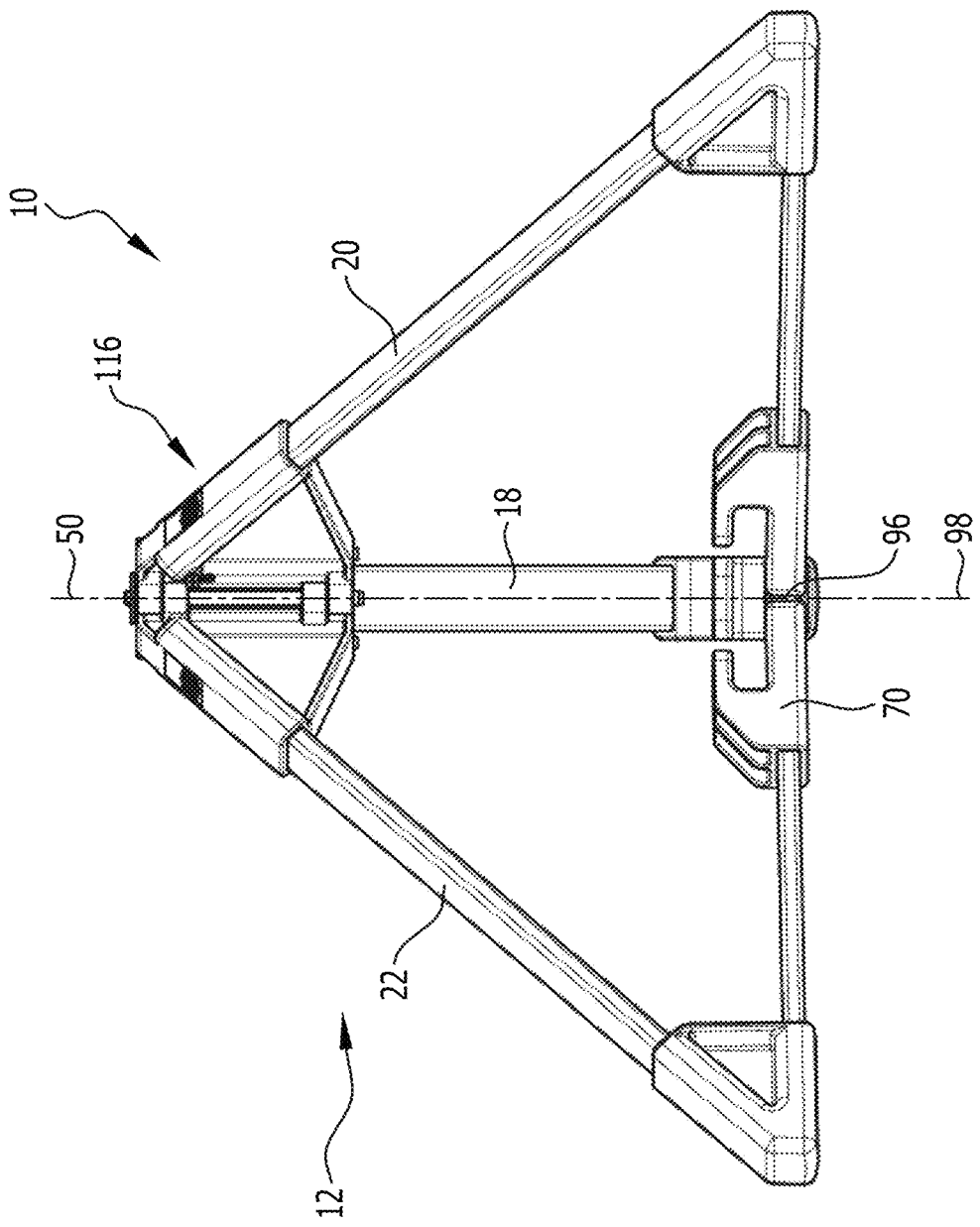
FIG. 4 shows a plan view of the holding stand according to FIG. 1 in the direction B according to FIG. 1.
Figure 5:
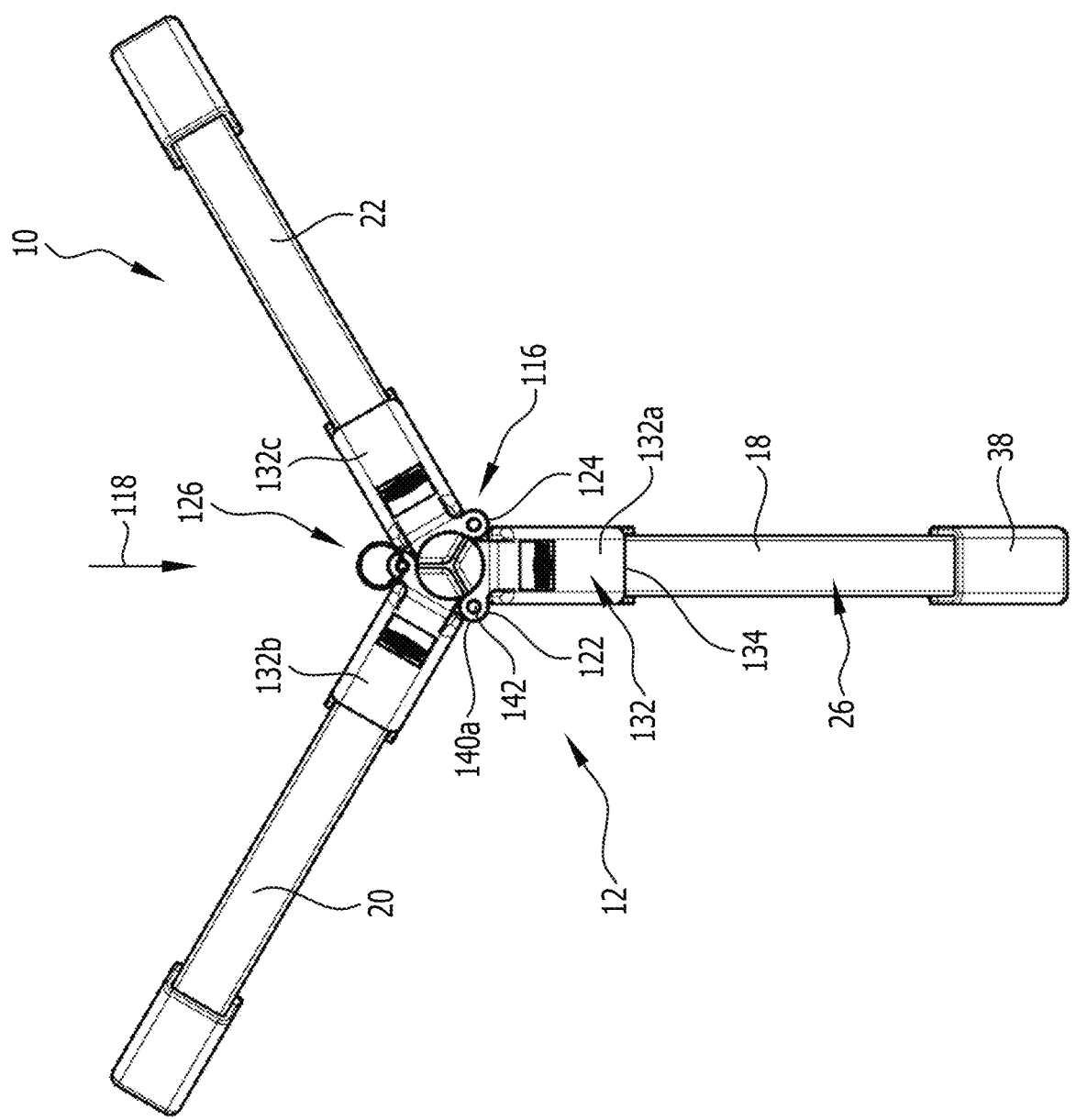
FIG. 5 shows a view from above of the holding stand according to FIG. 1 in the direction C according to FIG. 1.

The respective first arm 24 has an extent in a longitudinal extension axis 86 (FIG. 3). In the holding state 12 of the holding stand 10, this longitudinal extension axis 86 is oriented parallel or at not more than a very small acute angle (in particular, less than 2°) to the stand leg put up plane 54.

The wall regions 80 of different support bodies 70 are spaced from one another in the holding state 12. Thereby, between respective end sides 88 of the support bodies 70 (see, for example, FIG. 1) an aperture 90 is formed through which the support 16 is configured to pass. Furthermore, through the aperture 90, with corresponding positioning, the locating element 84 of the support 16 is configured to lie against the support put up face 62 and by means of corresponding rotation, the locating element 84 is bringable into the respective receptacles 82 of the support bodies 70.

Furthermore, in the longitudinal extension axis 86, the wall region 80 has a smaller longitudinal extent 92 than a corresponding longitudinal extent 94 in the longitudinal extension axis 86 of the partial region 76 (see FIG. 3).

Thereby, the end side 88 of the wall region 80 is set back in relation to an end side 96 of the corresponding base 74 of the support body 70 in the longitudinal extension axis 86.

In the holding state 12, the holding stand 10 has a centre 98 wherein this centre 98 is formed on a central axis and/or is a central axis. The height axis 50 is parallel to this centre 98 (the central axis). The wall region 80 is directed toward this centre 98, wherein it is spaced from the centre with its end side 88 so that the aperture 90 is formed.

Between adjacent support bodies 70 and, in particular, between wall regions 80 of adjacent support bodies 70, in the holding state 12 in the radial direction there is a free space sector 100 (FIG. 2 and FIGS. 10 to 12). This free space sector 100 serves to make possible that the locating element 84 is able to be fed through the aperture 90 and to be placed onto the support put up face 62. By rotating the locating element 84 (rotating the locating element 84 itself or the support 16 as a whole), the locating element 84 is then introducible into the respective receptacles 82 of the support bodies 70 and an overlap upwardly by means of the wall regions 80 of the support body 70 takes place (FIGS. 10, 11).

The support bodies 70 are adapted to one another on their end sides 102 which are end sides 102 of the base 74. They touch each other at their end sides 102 in the holding state 12 or have a small spacing which is not more than 5 mm and, in particular, not more than 4 mm and, in particular, not more than 3 mm and, in particular, not more than 2 mm and, in particular, not more than 1 mm (see, for example, FIG. 2).

The support bodies 70 are adapted to one another so that a specific support body 70 is adapted to all the other support bodies for touching and/or for a minimum spacing.

In the exemplary embodiment shown with three stand legs 18, 20, 22, three support bodies 70 are provided accordingly. A support body 70 has a first inclined face 104a and a second inclined face 104b (see, for example, FIG. 2), wherein the inclined face 104a of a specific support body is adapted to the corresponding inclined face 104b of a closest adjacent support body 70, and the second inclined face 104b of a specific support body 70 is adapted to the first inclined face 104a of the closest adjacent support body 70 (see FIG. 2).

The first inclined face 104a and the second inclined face 104b are each oriented at an acute angle to the longitudinal extension axis 60.

In an exemplary embodiment, this acute angle 106 (see, for example, FIG. 1) of the first inclined face 104*a* and of the second inclined face 104*b* to the longitudinal extension axis 86 is equal in magnitude.

Thereby, a tip 108 is formed on the respective support body which points to the centre 98 and therein lies, in particular, at the centre 98 or has not more than a small spacing, for example less than 2 mm or less than 1 mm from the centre 98.

In order to enable an adaptation of the support bodies 70 to the other support bodies 70, if three stand legs 18, 20, 22 are provided, the acute angle 106 is favourably 45° (see also FIG. 6).

By means of this corresponding construction of the support bodies 70 at the end sides 102 with the inclined faces 104*a*, 104*b*, in the holding state of the holding stand 10, there results an optimum force conduction (with the support 16 held and clamped) into the floor 58.

By means of the described construction of the support bodies 70 at their end sides 102, an end-side support of the support bodies 70 against one another is possible if they touch one another or if the spacing is small during force loading and, in particular, there is different force loading on different support bodies 70.

The pass-through receiving device 64 which is arranged on the second arm 26 has an aperture 110 for the passing-through of the support 16. This aperture 110 has a middle axis 112 which lies on the centre (the central axis) 98. The middle axis 112 of the aperture 110 meets the support put up face 62 at least approximately centrally.

In the height axis 50, the aperture 110 is spaced from the put up-receiving device 60 with its support put up face 62.

In an exemplary embodiment, the aperture 110 (in the holding state 12) has at least approximately a hollow cylindrical form.

The stand legs 18, 20, 22 are connected to one another by means of a connecting device 114. The connecting device 114 is arranged on the pass-through receiving device 64. The connecting device 114 forms the pass-through receiving device 64 and/or the pass-through receiving device 64 forms the connecting device 114.

The connecting device 114 is therein constructed so that it has a closed state 116 (FIGS. 1 to 6, 10 to 12) in which the pass-through receiving device 64 is closed such that the support is grippable and, accordingly, in relation to radial directions of the height axis 50 is held in a positive-locking manner. It has one or more opened states which enable the support 16 to be inserted into the aperture 90 in a transverse direction 118 transversely and, in particular, perpendicularly to the height axis 50 (see FIG. 5). By means of the transition from such an open state into the closed state 116, the support 16, having passed through at the pass-through receiving device 64, is then held by the peripherally closed aperture 110.

In an open state 120 of the connecting device 114 as shown in FIGS. 7 to 9, the holding stand 10 is in the storage state 14.

In the exemplary embodiment 10, in the closed state 116, the aperture 110 is completely closed peripherally as described in greater detail below. It is also possible, in principle, that in the closed state 116, with respect to a peripheral direction, the aperture 110 is not closed completely peripherally, but that a slit is still present which however has at most a size such that a support 16 positioned in the aperture 110 is not removable from the aperture 110 in a direction opposing the transverse direction 118.

In the holding stand 10, the connecting device 114 is constructed so that the first stand leg 18 is articulated by means of a first rotary joint 122 directly on the second stand leg 20. The first stand leg 18 is directly articulated by means of a second rotary joint 124 on the third stand leg 22. A locking device 126 is provided which, in the closed state 116, locks the second stand leg 20 to the third stand leg 22 such that a rotatability at the first rotary joint 122 and the second rotary joint 124 is blocked.

A first rotation axis 128 of the first rotary joint 122 (FIG. 3) lies transversely and, in particular, perpendicularly to the stand leg put up plane 54. The first rotation axis 128 lies parallel to the height axis 50. It is parallel to the centre (the central axis) 98.

Accordingly, the second rotary joint 124 has a second rotation axis 130 which is parallel to the first rotation axis 128.

The first rotation axis 128 and the second rotation axis 130 are, in particular, parallel to and spaced from the central axis 98.

In the open state 120, a rotation capability at the first rotary joint 122 and the second rotary joint 124 is possible. The locking device 126 is not effective in the open state. In the open state, the opening 110 is effectively openable laterally (relative to the transverse direction 118) in order to be able to bring the support into the aperture 110 of the pass-through receiving device 64. The rotatability about the rotation axes 128, 130 then enables the aperture 110 to close peripherally and then to fasten the closed state 116 with the locking device 126.

Furthermore, the rotatability about the rotation axes 128, 130 enables the transition from the closed state 116 into the open state 120 in the storage state 14 and/or then, starting from the storage state 14, by rotation about the rotation axes 128, 130 to create the holding state 12.

Arranged on each of the first end regions 34 of the second arms 26 is a holding body 132. A holding body 132 of this type is constructed in particular integrally and preferably in one piece. In an exemplary embodiment, it is made from a plastics material. It can, in principle, also be made from a metallic material.

In principle, different holding bodies 132 on different stand legs 18, 20, 22 have different functions. A first holding body 132*a* is situated on the second arm 26 of the first stand leg 18. A second holding body 132*b* is situated on the second arm 26 of the second stand leg 20. A third holding body 132*c* is situated on the second arm 26 of the third stand leg 22. The first holding body 132*a* is articulated on the adjacent holding bodies 132*b* and 132*c* by means of the first rotary joint 122 and/or the second rotary joint 124. The second holding body 132*b* is lockable to the third holding body 132*c* by means of the locking device 126.

In an advantageous embodiment, all three holding bodies 132*a*, 132*b*, 132*c* are identically configured. A holding body of this type is described below with the reference sign 132.

The holding body 132 has a receptacle 134 in which the second arm 26 is positioned and, in particular, is inserted. In an exemplary embodiment, the corresponding second strut 42 of the second arm 26 is pressed into the receptacle 134.

The holding body 132 has a limiting wall 136 which is a limiting wall for the aperture 110. In the closed state 116, the limiting walls 136 and the holding body 132*a*, 132*b*, 132*c* close the aperture 110 peripherally.

Between the limiting wall 136 and the receptacle 134, the holding body 132 has a transverse strut device 138. This is able to be formed by a continuous wall or the holding body 132 is able to have a continuous aperture between the receptacle 134 and the transverse strut device 138.

By means of the transverse strut device 138, the limiting wall 136 is able to be supported on the second strut 42.

In the holding state 12, the limiting wall 136 is oriented parallel to the height axis 50.

In an exemplary embodiment, the holding body 132 has the form of a triangular prism.

The holding body 132 has first lugs 140a, 140b toward one side spaced apart in the height axis 50. These first lugs 140a, 140b each have an aperture 142 which is continuous in relation to the height axis 50. The aperture 142 and the first lugs 140a and 140b are arranged aligned with one another in relation to the height axis 50.

Toward the other side, the holding body 132 has second lugs 144a, 144b spaced apart in the height axis. The second lugs 144a, 144b also have apertures which are arranged aligned with one another in relation to the height axis 50. The second lugs 144a, 144b are positioned so that they are bringable between the first lugs 140a, 140b of an adjacent holding body.

The first rotary joint 122 is formed in that the second holding body 132b is arranged on the first holding body 132a so that the second lugs 144a, 144b of the second holding body 132b are positioned between the first lugs 140a, 140b of the first holding body 132a (see, for example, FIG. 3). A pin 148 which has a suitable head 146 so that it is held in a captive manner on the connecting device 114 is passed through the corresponding apertures 142. The pin 148 is arranged parallel to the height axis 50 and enables the rotation about the first rotation axis 128.

Accordingly, the second lugs 144a, 144b of the first holding body 132a are coupled to the first lugs 140a, 140b of the third holding body 132c in order to connect the second rotary joint 124 with the rotatability about the second rotation axis 130. The corresponding pin is also fixedly arranged.

The locking device 126 comprises a pin 148 which is releasable and, in particular, relative to the height axis 50 is removable upwardly and/or for producing the locked and closed state 116 is insertable from above.

The pin 148 is provided for passing-through corresponding apertures of the first lugs 140a, 140b of the second holding body 132b and the second lugs 144a, 144b of the third holding body 132c. The pin 148 is not fixedly arranged but, as described, is removable.

In an exemplary embodiment, a securing ring 150 is arranged on a head 146 of the pin 148.

In the closed state 116, the pin 148 is suitably inserted. Thereby, the aperture 110 is closed by means of its limiting walls 136 and the pin 148 of the locking device 126 prevents opening. The rotatability at the rotary joints 122, 124 about the rotation axis 128 and/or 130 is blocked.

If the pin 148 is pulled out upwardly, the locking by means of the locking device 126 is released and a transition can take place from the closed state 116 to the open state. A rotation capability of the respective stand leg at the first rotary joint 122 about the first rotation axis 128 and at the second rotary joint 124 about the second rotation axis 130 are possible. Thereby, the aperture 110 is configured to be opened ("spread") in jaw-like manner in order to insert the support 16 and/or to transition into the storage state 14.

Since the support bodies 70 of different stand legs 18, 20, 22 are not connected to one another, this rotation of the stand legs 18, 20, 22 relative to one another is enabled.

In the holding state 12, in particular if a support 16 is held on the holding stand 10 with force application 68, the floor side 66 of the put up-receiving device 60 lies upon the stand leg put up plane 54. Thereby, a force can be conducted into the floor 58 on which the holding stand 10 stands. By this means, the force loading on the holding stand 10 can itself be kept small.

In particular, therein the support put up face 62 lies at least approximately parallel to the stand leg put up plane 54, wherein the support put up face 62 is on the put up-receiving device 60 facing away from the floor side 66.

In an exemplary embodiment, it is provided that in an unloaded state of the holding stand 10, the floor side 66 is spaced from the stand leg put up plane 54. In this unloaded state, the holding stand 10 then stands on the floor 58 via the respective undersides 56 of the connecting bodies 38. These undersides 56 of the connecting bodies 38 of the stand legs 18, 20, 22 define the stand leg put up plane 54.

In the exemplary embodiment with three stand legs 18, 20, 22 and thus three connecting bodies 38, the stand leg put up plane 54 is thereby unambiguously defined. There results a stable placeability of the holding stand 10 on the floor 58, wherein if the floor 58 is planar, the holding stand 10 does not stand "unsteadily" on the floor 58.

It is then provided that only with a sufficient force loading 68 does the floor side 66 lie in the stand leg put up plane 54.

This sufficient force loading 68 is established, in particular, so that when the support 16 is positioned on the holding stand 10, the intrinsic weight of the support 16 is not yet sufficient to bring the floor side 66 of the put up-receiving device 60 onto the stand leg put up plane 54. Thereby, a simple placement and alignment of the support 16 is enabled during a deployment.

Typical masses of supports 16 are in the range from 3 kg to 6 kg. It is thereby provided, in particular, that a force loading 68 which causes a bringing of the floor side 66 of the put up-receiving device 60 onto the stand leg put up plane 54 is above approximately 60 N. By means of a corresponding construction of the holding stand 10, in particular a specific threshold value or threshold value range is set, on exceeding of which the floor side 66 lies in the stand leg put up plane 54, wherein below this threshold or this threshold value range, a spacing exists between the floor side 66 and the stand leg put up plane 54, in order to enable an optimised placement of the holding stand 10.

The force loading over the specific threshold value or threshold value range therein comes about on clamping the support 16, wherein the force loading then exceeds the weight force of the support 16.

The relevant force loading 68, which then leads to the positioning of the floor side 66 on the stand leg put up plane 54 does not have to be an unambiguously defined specific threshold value, but rather it can also be a threshold value range, wherein the threshold value then lies within an interval.

In particular, the specific threshold value or an upper limit of the threshold value range for typical supports 16 is less than or equal to 100 N. The specific threshold value or a lower limit of the threshold value range is, in particular, greater than or equal to 30 N.

If, for example, it is assumed that typical supports 16 have a mass of up to approximately 6 kg, then a typical specific threshold value or a lower limit of the threshold value range is approximately 70 N. The specific threshold value and/or an upper limit of the threshold value range should not be too high since otherwise even with relatively large force loadings 68, no positioning of the floor side 66 on the stand leg put up plane 54 takes place.

The corresponding configuring to the specific threshold value or threshold value range takes place, for example, by formation of the respective first strut 40 of the first arms 24 and/or by corresponding formation of the connecting bodies 38 and/or by corresponding formation of the support bodies 70.

In the holding state 12 (see, for example, FIG. 1) the first arms 24 extend from the centre 98 outwardly in a radial direction relative to the height axis 50. The first arms 24 and/or their first struts 40 are oriented at least approximately parallel to the stand leg put up plane 54.

In particular, adjacent first arms of the stand legs 18, 20, 22 have an identical angular spacing which, with three stand legs, 18, 20, 22 is 120°.

In the holding state 12, the support bodies 70 of the holding stand 10 form a polygon 152 (FIG. 6). This polygon 152 is an imagined geometrical figure which is formed, for example, at an intersection of the respective ends of the support bodies 70 with a longitudinal axis of a corresponding corner 154. p is therefore greater than or equal to 3. In the exemplary embodiment shown, p is equal to 3.

If, for example, four stand legs are provided, then p is equal to 4.

The connecting bodies 38 also lie on a polygon congruent with the polygon 152.

The polygon 152 is planar.

A geometrical centre of gravity of this polygon 152 is at the centre 98. The first arms 24 are oriented, in relation to the polygon 152, along side bisectors or diagonals (for example, in the case of a square).

The corresponding partial regions 76 are oriented in spoke-like manner and also extend, in relation to the longitudinal extension axis 86, on bisectors and/or diagonals of the polygon 152. They form a type of cross with p arms. In the case of the holding stand 10, a cross or star with three cross arms is formed.

This results in a high level of placement stability.

Starting from the closed state, by means of opening the locking device 126 by removing the pin 148, the open state 120 and thereby the storage state 14 is achievable (FIGS. 7 to 9).

The stand legs 18, 20, 22 are therein rotated on the rotary joints 122, 124 so that the stand legs 18, 20, 22 lie packed beside one another (FIG. 7). The respective longitudinal axes 86 of the first arms 24 of the stand legs 18, 20, 22 lie at least approximately parallel to one another in the storage state 14. They lie to some extent over one another, wherein they are connected to one another at the rotary joints 122, 124.

In the storage state 14, in particular, adjacent stand legs 18, 20, 22 abut one another; in the exemplary embodiment shown according to FIG. 7, the first stand leg 18 abuts the third stand leg 22 and the second stand leg 20 abuts the first stand leg 18.

In the storage state 14, in particular, the first rotary joint 122, the second rotary joint 124 and the locking device 126 lie on a line 156 (FIG. 9); the lugs 140*a* of different stand legs 18, 20, 22 lie on the line 156. Furthermore, the lugs 140*b* of different stand legs 18, 20, 22 and the lugs 124*a*, 124*b* lie on this line 156.

In particular, therein, in the storage state 14, connecting bodies 38 of adjacent stand legs 18, 20 and/or 18, 22 abut one another.

The holding stand 10 according to the invention functions as follows:

The holding stand 10 serves to hold and also pre-position a support 16 (FIGS. 10 to 12).

The support 16 has the locating element 84 as a lower locating element and, for example, an upper locating element 158. The locating elements 84, 158 are constructed, in particular, as locating plates.

In an exemplary embodiment, the support 16 has a first support strut 160 and a second support strut 162. The support 16 is height-adjustable. A position of the second support strut 162 relative to the first support strut 160 is fastenably adjustable along a height axis 164 of the support 16.

A mechanism 166 is therein provided which serves for fastenable adjustment of the position of the second support strut 162 relative to the first support strut 160. By means of the mechanism 166, a corresponding clamping force is also exertable when clamping the support 16.

In the holding state 12, the support 16 is arranged, with respect to its height axis 164, at least approximately parallel to the height axis 50 of the holding stand 10. The support 16 is supported with its locating element 84 on the support put up face 62.

The support put up face 62 is, for example, formed ribbed in order to prevent slipping of the support 16 on the put up-receiving device 60 with the support put up face 62.

By means of the put up-receiving device 60 with its support put up face 62, the support 16 is supported downwardly to the stand leg put up plane 54 and/or to the floor 58 on which the holding stand 10 is placed.

The support is passed through the aperture 110 of the pass-through receiving device 64, for example, with the first support strut 160. This is in the closed state 116. By this means, with respect to radial directions to the height axis 50, a positive-locking holding of the support 16 takes place on the pass-through receiving device 64. It is supported in the transverse direction in relation to the height axis 50. The pass-through receiving device 64 embraces the support 16 at the aperture 110.

By this means, a defined positioning of the support 16 is achieved. This is then positionable toward a deployment.

Without clamping the support 16 during a deployment, the weight force of the intrinsic weight of the support 16 acts upon the put up-receiving device 60 in the direction of the stand leg put up plane 54.

If the support 16 is clamped during a deployment, in addition to the weight force of the intrinsic weight of the support 16, a further force loading of the put up-receiving device 60 acts in the direction of the floor 58.

If, as described above, the specific threshold value and/or the specific threshold value range is reached, then the floor side 66 of the put up-receiving device 60 with its support bodies 70 lies in the stand leg put up plane 54 and/or in the floor 58 and an optimised force conduction results.

However, it can also already be provided that in a starting state, the floor side 66 lies on the stand leg put up plane 54.

For removing the support 16 from the holding stand 10 into the holding state 12, an opening of the aperture 110 is carried out. For this purpose, the pin 148 of the locking device 126 is pulled out upwardly (away from the stand leg put up plane 54). Thereby, by means of rotation on the rotary joints 122, 124 about the respective rotation axis 128 and/or 130, the spacing between the stand legs 20 and 22 at the pass-through receiving device 64 (at the aperture 110) are able to increase. This enables a removal of the support 16 from the aperture 110 in the direction contrary to the transverse direction 118.

Since the support bodies 70 of different stand legs 18, 20, 22 are not connected to one another, this relative rotation of the stand legs 18, 20, 22 to one another is not hindered by the put up-receiving device 60.

The put up-receiving device 60 comprises the overlap elements 78 with an undercut. For removing the support 16, it may be necessary, if the locating element 84 correspondingly lies in the receptacles 82, to rotate the support 16 so that the locating element 84 is removable upwardly above the aperture 90. For removing contrary to the transverse direction 118, a slight lifting of the support 16 above the support bodies 70 may then also be necessary.

For inserting the support 16 on the holding stand 10 in an opened state, the process is carried out in corresponding manner. The support 16 is introduced, somewhat raised, in the transverse direction 18 into the opened aperture 110. The support 16 is lowered downwardly onto the stand leg put up plane 54 until the locating element 84 touches the support put up face 62. A rotation of the support 16 and/or of the locating element 84 is then carried out, so that the locating element enters the receptacle 82. By means of corresponding pivoting on the first rotary joint 122 and the second rotary joint 124, the aperture 110 is closed and the pin 148 of the locking device 126 is then inserted. Then the state shown in FIGS. 10 to 12 is reached. The support 16 is then positionable by means of the holding stand 10 at a deployment.

The holding stand 10 is storable in the storage state 14. With the pin 148 withdrawn, the stand legs 18, 20, 22 are pivoted on the rotary joints 122, 124 so that the state shown in FIGS. 7 to 9 is reached. The pin 148 is therein inserted in a captive manner on the second holding body 132b.

By means of the holding stand 10 according to the invention, for an operator, there results an optimised operability. A support 16 held on the holding stand 10 in the holding state 12 of the holding stand 10 holds effectively autonomously. An operator then has both hands free. He is able to perform a pre-positioning of the support 16 during a deployment and when the desired position is reached, he is then able to carry out a clamping by means of the mechanism 166 during the deployment. In the clamped state, an optimised force conduction results due to the arrangement of the floor side 66 of the put up-receiving device 60 on the stand leg put up plane 54.

REFERENCE SIGNS

10 Holding stand
12 Holding state
14 Storage state
16 Support
18 First stand leg
20 Second stand leg
22 Third stand leg
24 First arm
26 Second arm
28 Acute angle
30 First end region
32 Second end region
34 First end region
36 Second end region
38 Connecting body
40 First strut
42 Second strut
44 First receptacle
46 Second receptacle
48 Transverse strut device
50 Height axis
52 Stand element
54 Stand leg put up plane
56 Underside
58 Floor
60 Put up-receiving device
62 Support put up face
64 Pass-through receiving device
66 Floor side
68 Force loading
70 Support body
72 Receptacle
74 Base
76 Partial region
78 Overlap element
80 Wall region
82 Receptacle
84 Locating element
86 Longitudinal extension axis
88 End side
90 Aperture
92 Longitudinal extent
94 Longitudinal extent
96 End side
98 Centre
100 Free space
102 End side
104a First inclined face
104b Second inclined face
106 Acute angle
108 Tip
110 Aperture
112 Middle axis
114 Connecting device
116 Closed state
118 Transverse direction
120 Open state
122 First rotary joint
124 Second rotary joint
126 Locking device
128 First rotation axis
130 Second rotation axis
132 Holding body
132a First holding body
132b Second holding body
134 Receptacle
136 Limiting wall
138 Transverse strut device
140a First lug
140b Second lug
142 Aperture
144a First lug
142b Second lug
146 Head
148 Pin
150 Securing ring
152 Polygon
154 Corner
156 Line
158 Upper locating element
160 First support strut
162 Second support strut
164 Height axis
166 Mechanism

What is claimed is:

1. A holding stand for a support, comprising:
a put up-receiving device for the support, wherein the put up-receiving device has a support put up face, and
at least three stand legs, wherein each of the stand legs has a respective first arm and a respective second arm which are connected to one another, wherein the second arm is oriented at an acute angle to the first arm and wherein the put up-receiving device is arranged on the first arms of the stand legs, wherein:

in a holding state of the holding stand, the stand legs define a stand leg put up plane for the holding stand and a floor side of the put up-receiving device facing away from the support put up face lies in the stand leg put up plane, at least when a force loading of the put up-receiving device exceeds a specific threshold value or threshold value range in a direction of the stand leg put up plane;

the respective first arms each have a first end region on which the put up-receiving device is arranged and a second end region which is opposite to the first end region and at which one of the respective first arms is connected to a corresponding one of the respective second arms;

a support body is arranged on the first end region of each of the first arms, wherein the support bodies on the stand legs together form the put up-receiving device with the support put up face; and a support body has a base on which a partial region of the support put up face lies, and wherein arranged on the base is an overlap element with a wall region, wherein the wall region is spaced from the support put up face in a direction transversely to the support put up face and in the direction transversely to the support put up face lies above the support put up face.

2. The holding stand according to claim 1, wherein when the holding stand is placed on a floor by way of the stand leg put up plane, in the holding state of the holding stand, the floor side of the put up-receiving device contacts the floor at least when a force loading of the put up-receiving device exceeds a specific threshold value or threshold value range in the direction of the stand leg put up plane.

3. The holding stand according to claim 1, wherein if there is no force loading of the put up-receiving device in the direction of the stand leg put up plane or if the force loading lies below the specific threshold value or threshold value range, the floor side of the put up-receiving device is spaced from the stand leg put up plane.

4. The holding stand according to claim 1, wherein at least one of the following is provided:

the specific threshold value or threshold value range is greater than a weight force of a held support;

the specific threshold value or an upper limit of the threshold value range is less than or equal to 100 N;

the specific threshold value or a lower limit of the threshold value range is greater than or equal to 30 N.

5. The holding stand according to claim 1, wherein at least one of the following is provided:

the support put up face and the stand leg put up plane are at least approximately parallel to one another;

the first arms of the stand legs are oriented at least approximately parallel to the stand leg put up plane;

when holding a support, the first arms of the stand legs are oriented, starting from a central region in which the support put up face lies, outwardly and, in a radial direction;

the acute angle of the orientation of the second arm to the first arm of each of the stand legs lies in the range between 30° and 60°.

6. The holding stand according to claim 1, wherein the stand legs are connected to one another via a connecting device on the second arms.

7. The holding stand according to claim 6, wherein mutually adjacent stand legs are directly connected to one another via their respective second arms and, articulated to one another.

8. The holding stand according to claim 6, wherein a pass-through receiving device for the support is arranged or formed on the connecting device.

9. The holding stand according to claim 1, wherein a pass-through receiving device for the support is provided, wherein the pass-through receiving device has an aperture for a passing-through of the support.

10. The holding stand according to claim 9, wherein the pass-through receiving device is arranged on the second arms of the stand legs.

11. The holding stand according to claim 9, wherein at least one of the following is provided:

the aperture has a middle axis which meets the support put up face of the put up-receiving device;

the aperture has a middle axis which is oriented perpendicularly to at least one of (i) the stand leg put up plane and (ii) the support put up face;

the pass-through receiving device is spaced in a height axis from the support put up face of the put up-receiving device, wherein with a holding stand placed on a floor, in the holding state of the holding stand, the pass-through receiving device lies, relative to a direction of gravity, above the support put up face;

the aperture has a substantially hollow cylindrical shape;

the aperture is closed in a peripheral direction to hold the support or, when holding the support at the aperture, the pass-through receiving device has not more than one lateral slit through which the support is not able to be passed out.

12. The holding stand according to claim 9, wherein at least one stand leg is rotatably articulated on an adjacent stand leg in a region of the aperture.

13. The holding stand according to claim 12, wherein a locking device is provided, via which a second stand leg which is rotatably articulated on a first adjacent stand leg is lockable to a further third stand leg, wherein on a locking of the second stand leg to the third stand leg, a rotatability of the second stand leg on the first stand leg is blocked and the aperture is configured for holding a support.

14. The holding stand according to claim 13, wherein the locking device comprises a pin and receptacles for the pin on the second stand leg and the third stand leg, wherein a locking is created with the pin extended into the receptacles, and wherein with the pin removed, the second stand leg is rotatable on the first stand leg.

15. The holding stand according to claim 13, wherein at least one of the following is provided:

a rotation axis of the rotatable articulation of a stand leg on an adjacent stand leg lies perpendicularly to at least one of (i) the support put up face and (ii) the stand leg put up plane;

a rotation axis of the rotatable articulation lies at least approximately parallel to a height axis of the holding stand in the holding state of the holding stand;

a removing/inserting direction of a pin of a locking device for locking adjacent stand legs to one another lies perpendicularly to at least one of the support put up face and the stand leg put up plane;

adjacent stand legs are directly connected to one another via their respective second arms by way of the rotatable articulation or a locking device.

16. The holding stand according to claim 12, wherein a first stand leg is provided, to which a second stand leg is rotatably articulated by way of a first rotary joint, and wherein a third stand leg is provided which is rotatably articulated on the first stand leg via a second rotary joint, and wherein a locking device is provided which is arranged on the second stand leg and the third stand leg.

17. The holding stand according to claim 16, wherein a storage state of the holding stand is provided, with at least one of the following:

the first rotary joint, the second rotary joint and the locking device lie in one line in the storage state;

the first arm of the first stand leg, the first arm of the second stand leg and the first arm of the third stand leg lie parallel to one another in the storage state;

adjacent connecting bodies of the stand legs abut one another in the storage state, wherein a connecting body of a stand leg provides for a connection of the first arm and the second arm.

18. The holding stand according to claim 1, wherein situated on the second end region is a connecting body which connects the respective first arm to the respective second arm, with at least one of the following:

the connecting body is placed onto at least one of the first arm and the second arm;

the connecting body is made of a plastics material;

the connecting body is constructed in one piece;

the connecting body has a transverse strut device between a strut of the first arm and a strut of the second arm;

the connecting body is constructed as a triangular prism;

the connecting body forms a stand element for a respective one of the stand legs;

the connecting bodies of the stand legs together form a standing area for the holding stand.

19. The holding stand according to claim 1, wherein a support body is arranged on the first end region of each of the first arms, wherein the support bodies together form the put up-receiving device with the support put up face.

20. The holding stand according to claim 19, wherein at least one of the following is provided:

support bodies arranged on different stand legs are mutually separate elements;

a support body is made of a plastics material;

a support body is placed onto a strut of the respective first arm;

a support body is constructed as a single piece;

the support put up face provided on the support bodies is formed ribbed.

21. The holding stand according to claim 19, wherein a support body has a base on which a partial region of the support put up face lies, and wherein arranged on the base is an overlap element with a wall region, wherein the wall region is spaced from the support put up face in a direction transversely to the support put up face and in the direction transversely to the support put up face lies above the support put up face.

22. The holding stand according to claim 19, wherein a free space sector is arranged between adjacent support bodies in a radial direction.

23. The holding stand according to claim 19, wherein a support body is adapted at an end side to an opposingly situated support body, wherein in the holding state of the holding stand an end side spacing between oppositely situated support bodies is not more than 5 mm.

24. The holding stand according to claim 23, wherein a support body is provided at the end side with at least one inclined face.

25. The holding stand according to claim 1, wherein at least one of the following is provided:

wall regions of different support bodies are spaced from one another;

a wall region has a smaller longitudinal extent than a partial region of an associated support put up face on a same base;

a wall region is set back with respect to an end side of the base;

a wall region extends toward a centre of the holding stand on the support put up face.

26. The holding stand according to claim 1, wherein a holding state for holding the support is provided and wherein a storage state is provided with at least one of the following:

in the holding state, the first arms of the stand legs are oriented, starting from a centre at which the support put up face lies, outwardly and, radially outwardly;

in the holding state, the stand legs have an identical angular spacing from adjacent stand legs;

in the storage state, the first arms of the stand legs are oriented at least approximately parallel to one another;

in the storage state, the first arms of the stand legs are positioned packed over one another.

27. The holding stand according to claim 1, wherein the support put up face is constructed in multiple parts with a plurality of partial regions, wherein the partial regions are arranged on the respective first arms.

28. A holding stand for a support, comprising:

a put up-receiving device for the support, wherein the put up-receiving device has a support put up face, and at least three stand legs, wherein each of the stand legs has a respective first arm and a respective second arm which are connected to one another, wherein the second arm is oriented at an acute angle to the first arm and wherein the put up-receiving device is arranged on the first arms of the stand legs, wherein:

in a holding state of the holding stand, the stand legs define a stand leg put up plane for the holding stand and a floor side of the put up-receiving device facing away from the support put up face lies in the stand leg put up plane, at least when a force loading of the put up-receiving device exceeds a specific threshold value or threshold value range in a direction of the stand leg put up plane;

a pass-through receiving device for the support is provided, wherein the pass-through receiving device has an aperture for a passing-through of the support; and the pass-through receiving device has a connecting device or is arranged on a connecting device, wherein the connecting device has a closed state and an open state and, in the closed state of the connecting device, provision is made for a holding of the support on the pass-through receiving device and, in the open state, at least one of (i) the support is bringable in a direction parallel to the support put up face into the aperture and (ii) the support is removable in a direction parallel to the support put up face out of the aperture.

29. The holding stand according to claim 28, wherein, in the open state of the locking device, the holding stand is in a storage state or is bringable into a storage state, wherein in the storage state, the stand legs are oriented at least approximately parallel to one another.

30. The holding stand according to claim 28, wherein the respective first arms each have a first end region on which the put up-receiving device is arranged and a second end region which is opposite to the first end region and at which one of the respective first arms is connected to a corresponding one of the respective second arms.

31. A holding stand for a support, comprising:

a put up-receiving device for the support, wherein the put up-receiving device has a support put up face, and at least three stand legs, wherein each of the stand legs has a respective first arm and a respective second arm which are connected to one another, wherein the second arm is oriented at an acute angle to the first arm and wherein the put up-receiving device is arranged on the first arms of the stand legs, wherein:

in a holding state of the holding stand, the stand legs define a stand leg put up plane for the holding stand and a floor side of the put up-receiving device facing away from the support put up face lies in the stand leg put up plane, at least when a force loading of the put up-receiving device exceeds a specific threshold value or threshold value range in a direction of a stand leg put up plane;

a pass-through receiving device for the support is provided, wherein the pass-through receiving device has an aperture for a passing-through of the support; and the respective second arms have a first end region on which the pass-through receiving device for the support is arranged and a second end region which is opposite to the first end region and at which the respective second arms are each connected to a corresponding one of the respective first arms.

32. The holding stand according to claim 31, wherein on the first end region of the respective second arms, a holding body is situated, with at least one of the following:

the holding body is made of a plastics material;

the holding body has a limiting wall for the aperture which has, an extent parallel to a middle axis of the aperture;

the holding body has a transverse strut device between a strut of the second arm and the limiting wall;

the holding body is placed onto a strut of the second arm;

the holding body has the form of a triangular prism;

at least partially arranged or formed on the holding body is at least one rotary joint for articulating at least one of an adjacent second arm and a locking device for locking to an adjacent second arm.

33. A holding stand for a support, comprising:

a put up-receiving device for the support, wherein the put up-receiving device has a support put up face, and at least three stand legs, wherein each of the stand legs has a respective first arm and a respective second arm which are connected to one another, wherein the second arm is oriented at an acute angle to the first arm and wherein the put up-receiving device is arranged on the first arms of the stand legs, wherein:

in a holding state of the holding stand, the stand legs define a stand leg put up plane for the holding stand and a floor side of the put up-receiving device facing away from the support put up face lies in the stand leg put up plane, at least when a force loading of the put up-receiving device exceeds a specific threshold value or threshold value range in a direction of the stand leg put up plane;

the respective first arms each have a first end region on which the put up-receiving device is arranged and a second end region which is opposite to the first end region and at which one of the respective first arms is connected to a corresponding one of the respective second arms;

situated on the second end region is a connecting body which connects the respective first arm to the respective second arm, with at least one of the following:

the connecting body is placed onto at least one of the first arm and the second arm;

the connecting body is made of a plastics material;

the connecting body is constructed in one piece;

the connecting body has a transverse strut device between a strut of the first arm and a strut of the second arm;

the connecting body is constructed as a triangular prism;

the connecting body forms a stand element for a respective stand leg;

the connecting bodies of the stand legs together form a standing area for the holding stand; and the connecting bodies of the stand legs each have a respective underside which lies upon the stand leg put up plane, wherein the respective underside is spaced from the put up-receiving device.

34. The holding stand according to claim 33, wherein in the holding state of the holding stand, the support bodies lie on a regular p-sided polygon, wherein p≥3 and with one of the following:

a geometrical centre of gravity of the polygon lies at a centre of the support put up face;

at least one of (i) the support bodies and (ii) the struts of the first arms are oriented along side bisectors or diagonals of the polygon;

in the holding state of the holding stand, at least one if (i) the support bodies and (ii) the struts of the first arms are oriented radially;

partial regions of the support put up faces are arranged in a shape of a spoke;

the support bodies of different stand legs are directed toward one another at their end sides and are not connected to one another at the end sides.

35. A combination of a holding stand and a support, said holding stand comprising:

a put up-receiving device for the support, wherein the put up-receiving device has a support put up face, and at least three stand legs, wherein each of the stand legs has a first arm and a second arm which are connected to one another, wherein the second arm is oriented at an acute angle to the first arm and wherein the put up-receiving device is arranged on the first arms of the stand legs, wherein:

in a holding state of the holding stand, the stand legs define a stand leg put up plane for the holding stand and a floor side of the put up-receiving device facing away from the support put up face lies in the stand leg put up plane, at least when a force loading of the put up-receiving device exceeds a specific threshold value or threshold value range in a direction of the stand leg put up plane;

the support is removably held by the holding stand;

the respective first arms each have a first end region on which the put up-receiving device is arranged and a second end region which is opposite to the first end region and at which one of the respective first arms is connected to a corresponding one of the respective second arms, a support body is arranged on the first end region of each of the first arms, wherein the support bodies on the stand legs together form the put up-receiving device with the support put up face; and a support body has a base on which a partial region of the support put up face lies, and wherein arranged on the base is an overlap element with a wall region, wherein the wall region is spaced from the support put up face in a direction transversely to the support put up face and in the direction transversely to the support put up face lies above the support put up face.

36. A combination of a holding stand and a support, said holding stand comprising:

a put up-receiving device for the support, wherein the put up-receiving device has a support put up face, and at least three stand legs, wherein each of the stand legs has a first arm and a second arm which are connected to one another, wherein the second arm is oriented at an acute angle to the first arm and wherein the put up-receiving device is arranged on the first arms of the stand legs, wherein:

in a holding state of the holding stand, the stand legs define a stand leg put up plane for the holding stand and a floor side of the put up-receiving device facing away from the support put up face lies in the stand leg put up plane, at least when a force loading of the put up-receiving device exceeds a specific threshold value or threshold value range in a direction of the stand leg put up plane;

the support is removably held by the holding stand;

a pass-through receiving device for the support is provided, wherein the pass-through receiving device has an aperture for a passing-through of the support; and the pass-through receiving device has a connecting device or is arranged on a connecting device, wherein the connecting device has a closed state and an open state and, in the closed state of the connecting device, provision is made for a holding of the support on the pass-through receiving device and, in the open state, at least one of (i) the support is bringable in a direction parallel to the support put up face into the aperture and (ii) the support is removable in a direction parallel to the support put up face out of the aperture.

37. A combination of a holding stand and a support, said holding stand comprising:

a put up-receiving device for the support, wherein the put up-receiving device has a support put up face, and at least three stand legs, wherein each of the stand legs has a first arm and a second arm which are connected to one another, wherein the second arm is oriented at an acute angle to the first arm and wherein the put up-receiving device is arranged on the first arms of the stand legs, wherein:

in a holding state of the holding stand, the stand legs define a stand leg put up plane for the holding stand and a floor side of the put up-receiving device facing away from the support put up face lies in the stand leg put up plane, at least when a force loading of the put up-receiving device exceeds a specific threshold value or threshold value range in a direction of the stand leg put up plane;

the support is removably held by the holding stand;

a pass-through receiving device for the support is provided, wherein the pass-through receiving device has an aperture for a passing-through of the support; and the respective second arms have a first end region on which the pass-through receiving device for the support is arranged and a second end region which is opposite to the first end region and at which the respective second arms are each connected to a corresponding one of the respective first arms.

38. A combination of a holding stand and a support, said holding stand comprising:

a put up-receiving device for the support, wherein the put up-receiving device has a support put up face, and at least three stand legs, wherein each of the stand legs has a first arm and a second arm which are connected to one another, wherein the second arm is oriented at an acute angle to the first arm and wherein the put up-receiving device is arranged on the first arms of the stand legs, wherein:

in a holding state of the holding stand, the stand legs define a stand leg put up plane for the holding stand and a floor side of the put up-receiving device facing away from the support put up face lies in the stand leg put up plane, at least when a force loading of the put up-receiving device exceeds a specific threshold value or threshold value range in a direction of the stand leg put up plane;

the support is removably held by the holding stand;

the respective first arms each have a first end region on which the put up-receiving device is arranged and a second end region which is opposite to the first end region and at which one of the respective first arms is connected to a corresponding one of the respective second arms;

situated on the second end region is a connecting body which connects the respective first arm to the respective second arm, with at least one of the following:

the connecting body is placed onto at least one of the first arm and the second arm;

the connecting body is made of a plastics material;

the connecting body is constructed in one piece;

the connecting body has a transverse strut device between a strut of the first arm and a strut of the second arm;

the connecting body is constructed as a triangular prism;

the connecting body forms a stand element for a respective stand leg;

the connecting bodies of the stand legs together form a standing area for the holding stand; and the connecting bodies of the stand legs each have a respective underside which lies upon the stand leg put up plane, wherein the respective underside is spaced from the put up-receiving device.

* * * * *